United States Patent
Hirata et al.

(10) Patent No.: US 6,545,083 B1
(45) Date of Patent: *Apr. 8, 2003

(54) CEMENT ADDITIVE

(75) Inventors: Tsuyoshi Hirata, Kobe (JP); Tsutomu Yuasa, Osaka (JP); Koichiro Nagare, Suita (JP); Hirokatsu Kawakami, Sakai (JP)

(73) Assignee: Nippon Shokubai Co, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/522,300

(22) Filed: Mar. 9, 2000

(30) Foreign Application Priority Data

Mar. 9, 1999 (JP) .......................... 11-061337
Oct. 26, 1999 (JP) .......................... 11-303797

(51) Int. Cl.$^7$ .............................................. C08L 33/02
(52) U.S. Cl. .............................. 524/556; 524/4; 524/5; 524/558; 526/240; 526/318.41
(58) Field of Search ................. 524/556, 5, 4, 524/558; 526/240, 318.41

(56) References Cited

U.S. PATENT DOCUMENTS

| | | | |
|---|---|---|---|
| 5,660,626 A | | 8/1997 | Ohta et al. ............. 106/810 |
| 5,661,206 A | | 8/1997 | Tanaka et al. .......... 524/378 |
| 5,911,820 A | * | 6/1999 | Satoh et al. ............ 106/823 |
| 5,925,184 A | | 7/1999 | Hirata .................... 106/696 |
| 6,087,418 A | * | 7/2000 | Yamashita et al. ......... 524/5 |
| 6,165,262 A | * | 12/2000 | Kono et al. ............ 106/802 |

FOREIGN PATENT DOCUMENTS

| | | |
|---|---|---|
| EP | 0 792 850 A1 | 9/1997 |
| EP | 0 983 976 A1 | 3/2000 |
| JP | 6-279082 | 10/1994 |
| JP | 6-298557 | 10/1994 |
| JP | 6-321596 | 11/1994 |
| JP | 7-25650 | 1/1995 |
| JP | 7-53249 | 2/1995 |
| JP | 8-268741 | 10/1996 |
| JP | 9-286645 | 11/1997 |
| JP | 11-106249 | 4/1999 |

OTHER PUBLICATIONS

Patent Abstracts of Japan, vol. 1999, No. 8, Jun. 30, 1999 & JP 11 060305 A, Mar. 2, 1999.

* cited by examiner

Primary Examiner—Judy M. Reddick
(74) Attorney, Agent, or Firm—Connolly Bove Lodge & Hutz LLP

(57) ABSTRACT

The present invention is thus directed to a cement additive which comprises a copolymer (A) obtained by polymerizing a monomer mixture (K), wherein;

said monomer mixture (K) comprises a polyalkylene glycol ester monomer (I) represented by the general formula (1):

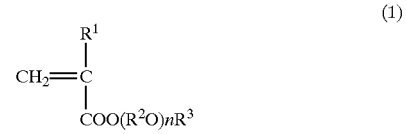

(1)

a polyalkylene glycol ester monomer (II) represented by the general formula (2):

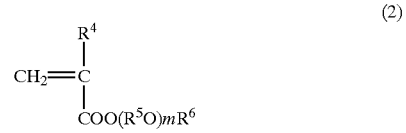

(2)

and a carboxylic acid monomer (III) represented by the general formula (3):

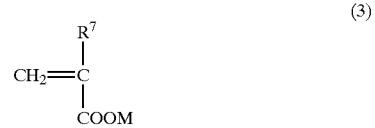

(3)

5 Claims, 2 Drawing Sheets

CEMENT ADDITIVE

FIELD OF THE INVENTION

The present invention relates to a cement additive capable of effectively reducing the air entraining property and producing an outstanding flowability retaining effect.

BACKGROUND OF THE INVENTION

Since 1981 when early degradation of concrete structures posed a social problem, it has been strongly demanded that the amount of water per unit volume of concrete be reduced so that the workability and durability of concrete may be improved. In such circumstances, technological innovations have been made in relation to the cement admixture which exerts a great influences on the quality and performance characteristics of cement mixes.

In particular, with regard to polycarboxylic acid type cement dispersing agents, which show higher water-reducing effects as compared with the conventional cement dispersing agents, such as those of the naphthalene type, a number of proposals have been made for using them as high-performance air-entraining and water-reducing agents. However, such polycarboxylic acid type cement additives exhibit potent air entraining properties and, furthermore, the amount of air entrained by them varies with time and it is difficult to control the variation, so that desired concrete strength can hardly be attained. Therefore, admixture manufacturers have made energetic investigations to develop high-performance air-entraining and water-reducing agents with a decreased air entraining property.

In JP Kokai H06-298557, there are proposed polymers obtained by polymerizing a polyethylene glycol monoester monomer (A), a polypropylene glycol monoester monomer (B) and an unsaturated carboxylic acid monomer (C) and, in JP Kokai H06-279082, there are proposed polymers obtained by polymerizing a monomer (A) derived from (meth)acrylic acid by blockwise addition of (poly)propylene oxide-polyethylene oxide-(poly)propylene oxide and an unsaturated carboxylic acid monomer (C). Further, in JP Kokai H06-321596, there are proposed copolymers obtained by copolymerizing a polyethylene polypropylene glycol monoester monomer (A) or polypropylene polyethylene glycol monoester monomer (B) and an unsaturated carboxylic acid monomer (C).

Under the present circumstances, however, the polymers with polypropylene glycol chains and polyethylene glycol chains introduced therein separately as disclosed in JP Kokai H06-298557 as well as the polymers with polypropylene glycol-polyethylene glycol chains alone introduced therein as disclosed in JP Kokai H06-279082, JP Kokai H06-298557 or JP Kokai H06-321596 are still incompetent for effectively reducing air entraining property and providing good flowability.

In view of the prior art mentioned above, the present invention has for its object to provide a cement additive which has a reduced air entraining property and can provide good flowability.

SUMMARY OF INVENTION

The present invention is thus directed to a cement additive which comprises a copolymer (A) obtainable by polymerizing a monomer mixture (K), wherein;

said monomer mixture (K) comprises a polyalkylene glycol ester monomer (I) represented by the general formula (1):

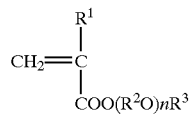

(1)

[wherein $R^1$ represents a hydrogen atom or a methyl group, the $R^2O$ groups are the same or different and each represents an oxyalkylene group containing 2 to 18 carbon atoms and the majority thereof are oxyalkylene groups containing not less than 3 carbon atoms, $R^3$ represents an aliphatic hydrocarbon group containing 4 to 30 carbon atoms or an alicyclic hydrocarbon group containing 4 to 30 carbon atoms, and n represents the average number of moles of oxyalkylene groups added and is a number of 5 to 300, with the condition that the average number of moles of oxyalkylene groups containing not less than 3 carbon atoms as added is not less than 5];

a polyalkylene glycol ester monomer (II) represented by the general formula (2):

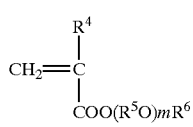

(2)

[wherein $R^4$ represents a hydrogen atom or a methyl group, the $R^5O$ groups are the same or different and each represents an oxyalkylene group containing 2 to 18 carbon atoms and the majority thereof are oxyethylene groups, $R^6$ represents a hydrocarbon group containing 1 to 30 carbon atoms, and m represents the average number of moles of oxyalkylene groups added and is a number of 2 to 300]; and a carboxylic acid monomer (III) represented by the general formula (3):

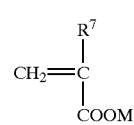

(3)

[wherein $R^7$ represents a hydrogen atom or a methyl group, and M represents a hydrogen atom, a metal atom, an ammonium group or an organic amine group].

The present invention is also directed to a method of producing said copolymer (A) for use as a cement additive,
which comprises polymerizing a monomer mixture (K),
the polymerization reaction being effected by adding a polymerization initiator to a solution containing a monomer mixture (K), and
said monomer mixture (K) comprising said polyalkylene glycol ester monomer (I) of general formula (1), said polyalkylene glycol ester monomer (II) of general formula (2) and said carboxylic acid monomer (III) of general formula (3).

The present invention is further directed to a cement additive comprising the polymer (B),
wherein a 0.1% by weight aqueous solution the polymer (B) treated with ether has a surface tension of 0.1 to 50 mN/m and an ultraviolet transmittance at 600 nm of 30 to 100%.

The present invention is still further directed to a cement admixture which comprises an air-entraining agent and said cement additive.

DETAILED DESCRIPTION OF THE INVENTION

Figure 1:
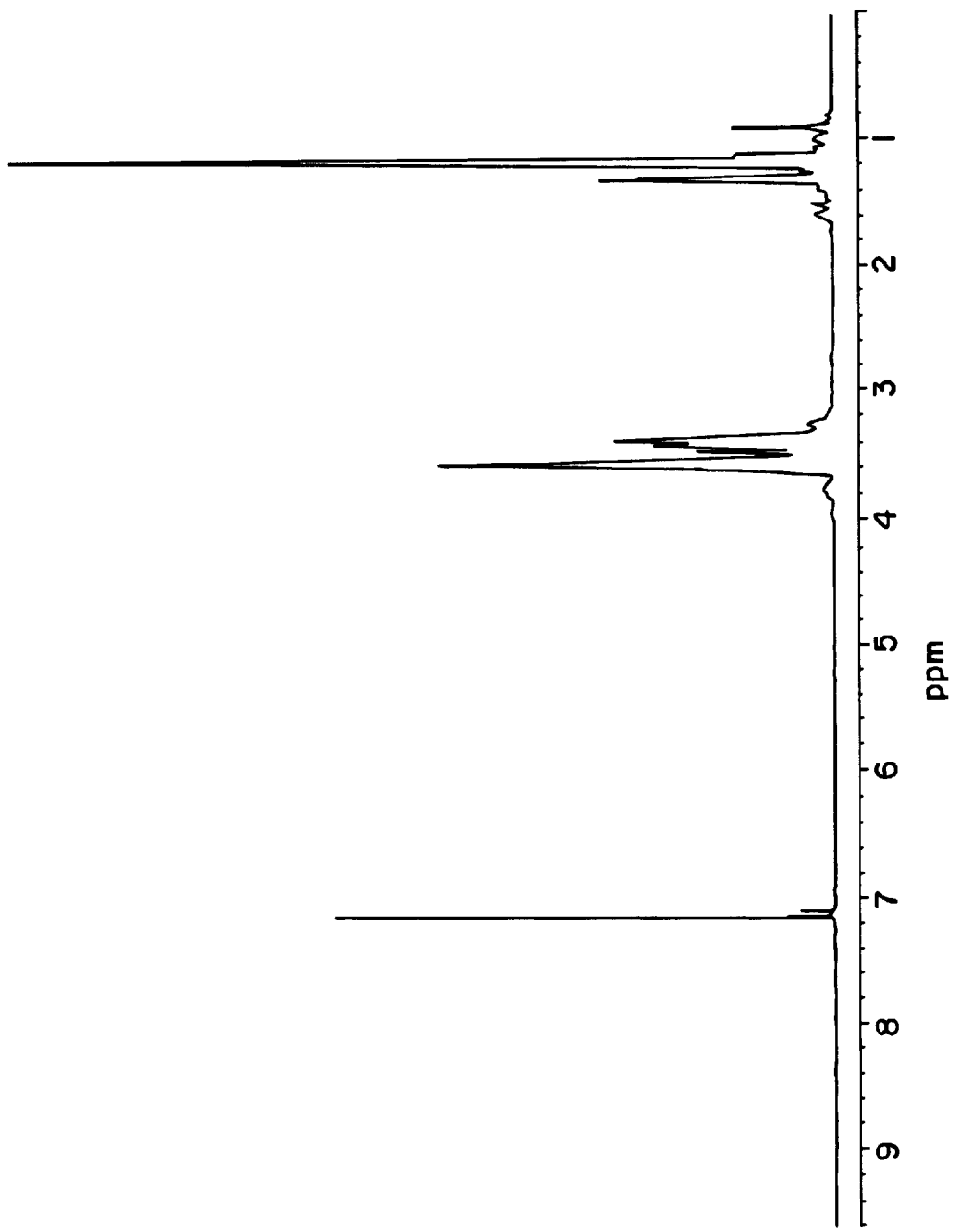
FIG. 1 is the $^1$H-NMR spectrum of an alcohol mixture (a-1).

Hereinafter, this invention is described in detail.

The cement additive of the present invention comprises the copolymer (A) obtained by polymerizing the monomer mixture (K).

In the present specification, the term "cement additive" means a single-component material which can be added to cement compositions.

The proportion of copolymer (A) in the above cement additive is not particularly restricted insofar as the effects of the present invention can be implemented.

Said copolymer (A) may be used singly or in a combination of two or more species.

Said monomer mixture (K) comprises the polyalkylene glycol ester monomer (I), polyalkylene glycol ester monomer (II) and carboxylic acid monomer (III). Each of there monomers may be a single species of compound or a mixture of two or more species.

Said monomer (I) and (II) each may have one and the same number of moles of oxyalkylene groups added or have a certain distribution of numbers of moles of oxyalkylene groups added.

In the present specification, the term "average number of moles added" means the mean value of numbers of moles of the relevant organic group added per mole of monomer (I) or monomer (II).

Said polyalkylene glycol ester monomer (I) is represented by the above general formula (1).

In case two or more species of the oxyalkylene group represented by —($R^2$O)— in the above general formula (1) are present in one and the same molecule of the polyalkylene glycol ester monomer (I), the oxyalkylene group represented by —($R^2$O)— may constitute the random, block, alternating or like addition mode. For instance, when two or more alkylene oxides containing 3 to 18 carbon atoms, or one or more alkylene oxides containing 3 to 18 carbon atoms and ethylene oxide, are added in the segment formed by addition of alkylene oxide containing 3 to 18 carbon atoms, the addition mode may be any of those mentioned above.

The majority of said $R^2$O groups are oxyalkylene groups containing not less than 3 carbon atoms.

In the above context, the "majority" in said $R^2$O groups means that when a plurality of oxyalkylene group species are present in the monomer molecule, the majority of oxyalkylene groups constitutes the major part of those oxyalkylene groups which are present. In accordance with the present invention, when the oxyalkylene groups containing not less than 3 carbon atoms corresponds to the major part of the oxyalkylene groups represented by said —($R^2$O)—, the effects of the structure in copolymer (A) can be obtained as resulting from the polyalkylene glycol ester monomer (I). Therefore, when oxyalkylene groups containing not less than 3 carbon atoms are present in a proportion sufficient to produce such effects, said groups "constitute the major part" as mentioned above and can be the "majority" so referred to herein.

In the above polyalkylene glycol ester monomer (I), the "major part" referred to above is preferably not less than n×0.5, for instance, where n is the total number of oxyalkylene groups therein. When the proportion in question is less than n×0.5, the hydrophilicity is so high that the air entraining property may not be sufficiently reduced. More preferred is a proportion of not less than n×0.6, in particular not less than n×0.7, still more preferably not less than n×0.8, and most preferably n×0.8 to n×0.9.

In the present specification, not less than n×0.5, for instance, is sometimes referred also to as not less than 50 mole percent in terms of average number of moles added.

Among the above oxyalkylene groups represented by —($R^2$O)—, the $C_3$–$C_{18}$ alkylene oxide to be added are not particularly restricted. Thus, for example, such alkylene oxides as propylene oxide, butylene oxide, isobutylene oxide, 1-butene oxide and 2-butene oxide may be used. These may be used singly or two or more of them may be used combinedly. Among them, the use of an adduct of an alkylene oxide containing 3 to 6 carbon atoms is preferred and the use of an adduct of propylene oxide or butylene oxide, containing 3 or 4 carbon atoms respectively, is more preferred. In cases where the oxyalkylene groups comprise an ethylene oxide-derived portion, it is preferred, from the viewpoint of air entrained property reduction and improved productivity of esterification with (meth)acrylic acid, that said ethylene oxide-derived portion is added at the site of ester bonding with (meth)acrylic acid.

The number n of the oxyalkylene group represented by —($R^2$O)— is 5 to 300. The average number of moles of an added oxyalkylene group(s) containing not less than 3 carbon atoms is not less than 5. When n is less than 5 or when the average number of moles of the oxyalkylene group(s) containing not less than 3 carbon atoms is less than 5, the air entraining property cannot be reduced to a sufficient extent. On the other hand, n should be not more than 300, since an oxyalkylene chain in which n is more than 300 is difficult to prepare. Further, n is preferably 5 to 200, more preferably 5 to 100, still more preferably 5 to 50, in particular 10 to 50, and most preferably 10 to 30.

The above group $R^3$ is not particularly restricted but may be any aliphatic or alicyclic hydrocarbon group containing 4 to 30 carbon atoms. Thus, for instance, such aliphatic or alicyclic hydrocarbon groups as alkyl, alkenyl and alkynyl groups containing 4 to 30 carbon atoms can be used. When the number of carbon atoms is not more than 3, the water solubility of copolymer (A) is high, leading to failure to reduce the air entrained property to a satisfactory extent. When the number of carbon atoms is not less than 30, the hydrophobicity of copolymer (A) is so strong that good dispersibility cannot be obtained.

For attaining reduction of air entrained property and good dispersibility, said group $R^3$ is preferably an aliphatic or alicyclic hydrocarbon group containing 4 to 25 carbon atoms, more preferably 6 to 22 carbon atoms, still more preferably 8 to 20 carbon atoms. Among such hydrocarbon groups, straight chain saturated hydrocarbon groups, branched chain saturated hydrocarbon groups, straight chain unsaturated hydrocarbon groups and branched chain unsaturated hydrocarbon groups are preferably used.

The above polyalkylene glycol ester monomer (I) may be any one falling under the category defined hereinabove, without any particular restriction. Thus, there can be mentioned, for example, esterification products (1) of (meth) acrylic acid with alkoxypolyalkylene glycols derived from any of aliphatic alcohols containing 4 to 30 carbon atoms, such as 1-butanol, 2-butanol, 1-pentanol, 2-pentanol, 3-pentanol, tert-butanol, 1-hexanol, 2-hexanol, 3-hexanol, 3,3-dimethyl-1-butanol, 2,3-dimethyl-1-butanol, 2,2-dimethyl-1-butanol, octanol, 2-ethyl-1-hexanol, nonyl alcohol, lauryl alcohol, cetyl alcohol, stearyl alcohol, pentadecanol, hexadecanol, heptadecanol, octadecanol and nondecanol, alkenyl-containing alcohols containing 4 to 30 carbon atoms, such as methallyl alcohol, crotyl alcohol and isoprene alcohol, or cyclic alcohols containing 4 to 30 carbon atoms, such as cyclobutanol, cyclopentanol and cyclohexanol, said alkoxypolyalkylene glycols being formed by adding 5 to 300 moles of an alkylene oxide(s) containing 2 to 18 carbon atoms so that the average number of moles of the $C_3$–$C_{18}$ alkylene oxide(s) added may be not less than 50% of the average total number of moles of all alkylene oxides added and that the average number of moles of the $C_3$–$C_{18}$ alkylene oxide(s) added may amount to 5 to 300.

As said esterification products (1), there may be mentioned, for example, those alkoxypoly(alkylene glycol) containing 2 to 18 carbon atoms; not less than 50 mole percent of the alkylene glycol units being alkylene glycol containing 3 to 18 carbon atoms) (meth)acrylate esters which are given below:

Butoxypolypropylene glycol mono(meth)acrylate, butoxy{polypropylene glycol-polyethylene glycol}(meth)acrylate, butoxypolybutylene glycol mono(meth)acrylate, butoxy{polybutylene glycol-polyethylene glycol}mono(meth)acrylate, butoxy{polypropylene glycol-polybutylene glycol}mono(meth)acrylate, butoxy{polypropylene glycol-polybutylene glycol-polyethylene glycol}pentoxypolypropylene glycol mono(meth)acrylate, pentoxy{polypropylene glycol-polyethylene glycol}(meth)acrylate, pentoxypolybutylene glycol mono(meth)acrylate, pentoxy{polybutylene glycol-polyethylene glycol}mono(meth)acrylate, pentoxy{polypropylene glycol-polybutylene glycol}mono(meth)acrylate, pentoxy{polypropylene glycol-polybutylene glycol-polyethylene glycol}mono(meth)acrylate, hexoxypolypropylene glycol mono(meth)acrylate, hexoxy{polypropylene glycol-polyethylene glycol}(meth)acrylate, hexoxypolybutylene glycol mono(meth)acrylate, hexoxy{polybutylene glycol-polyethylene glycol}mono(meth)acrylate, hexoxy{polypropylene glycol-polybutylene glycol}mono(meth)acrylate, hexoxy{polypropylene glycol-polybutylene glycol-polyethylene glycol}mono(meth)acrylate, heptoxypolypropylene glycol mono(meth)acrylate, heptoxy{polypropylene glycol-polyethylene glycol}(meth)acrylate, heptoxypolybutylene glycol mono(meth)acrylate, heptoxy{polybutylene glycol-polyethylene glycol}mono(meth)acrylate, heptoxy{poly propylene glycol-polybutylene glycol}mono(meth)acrylate, heptoxy{polypropylene glycol-polybutylene glycol-polyethylene glycol}mono(meth)acrylate, octoxypolypropylene glycol mono(meth)acrylate, octoxy{polypropylene glycol-polyethylene glycol}(meth)acrylate, octoxypolybutylene glycol mono(meth)acrylate, octoxy{polybutylene glycol-polyethylene glycol}mono(meth)acrylate, octoxy{polypropylene glycol-polybutylene glycol}mono(meth)acrylate, octoxy{polypropylene glycol-polybutylene glycol-polyethylene glycol}mono(meth)acrylate, nonanoxypolypropylene glycol mono(meth)acrylate, nonanoxy{polypropylene glycol-polyethylene glycol}(meth)acrylate, nonanoxypolybutylene glycol mono(meth)acrylate, nonanoxy{polybutylene glycol-polyethylene glycol}mono(meth)acrylate, nonanoxy{polypropylene glycol-polybutylene glycol}mono(meth)acrylate, nonanoxy{polypropylene glycol-polybutylene glycol-polyethylene glycol}mono(meth)acrylate, decanoxypolypropylene glycol mono(meth)acrylate, decanoxy{polypropylene glycol-polyethylene glycol}(meth)acrylate, decanoxypolybutylene glycol mono(meth)acrylate, decanoxy{polybutylene glycol-polyethylene glycol}mono(meth)acrylate, decanoxy{polypropylene glycol-polybutylene glycol}mono(meth)acrylate, decanoxy{polypropylene glycol-polybutylene glycol-polyethylene glycol}mono(meth)acrylate, undecanoxypolypropylene glycol mono(meth)acrylate, undecanoxy{polypropylene glycol-polyethylene glycol}(meth)acrylate, undecanoxypolybutylene glycol mono(meth)acrylate, undecanoxy{polybutylene glycol-polyethylene glycol}mono(meth)acrylate, undecanoxy{polypropylene glycol-polybutylene glycol}mono(meth)acrylate, undecanoxy{polypropylene glycol-polybutylene glycol-polyethylene glycol}mono(meth)acrylate, dodecanoxypolypropylene glycol mono(meth)acrylate, dodecanoxy{polypropylene glycol-polyethylene glycol}(meth)acrylate, dodecanoxypolybutylene glycol mono(meth)acrylate, dodecanoxy{polybutylene glycol-polyethylene glycol}mono(meth)acrylate, dodecanoxy{polypropylene glycol-polybutylene glycol}mono(meth)acrylate, dodecanoxy{polypropylene glycol-polybutylene glycol-polyethylene glycol}mono(meth)acrylate, tridecanoxypolypropylene glycol mono(meth)acrylate, tridecanoxy{polypropylene glycol-polyethylene glycol}(meth)acrylate, tridecanoxypolybutylene glycol mono(meth)acrylate, tridecanoxy{polybutylene glycol-polyethylene glycol}mono(meth)acrylate, tridecanoxy{polypropylene glycol-polybutylene glycol}mono(meth)acrylate, tridecanoxy{polypropylene glycol-polybutylene glycol-polyethylene glycol}mono(meth)acrylate, tetradecanoxypolypropylene glycol mono(meth)acrylate, tetradecanoxy{polypropylene glycol-polyethylene glycol}(meth)acrylate, tetradecanoxypolybutylene glycol mono(meth)acrylate, tetradecanoxy{polybutylene glycol-polyethylene glycol}mono(meth)acrylate, tetradecanoxy{polypropylene glycol-polybutylene glycol}mono(meth)acrylate, tetradecanoxy{polypropylene glycol-polybutylene glycol-polyethylene glycol}mono(meth)acrylate, pentadecanoxypolypropylene glycol mono(meth)acrylate, pentadecanoxy{polypropylene glycol-polyethylene glycol}(meth)acrylate, pentadecanoxypolybutylene glycol mono(meth)acrylate, pentadecanoxy{polybutylene glycol-polyethylene glycol}mono(meth)acrylate, pentadecanoxy{polypropylene glycol-polybutylene glycol}mono(meth)acrylate, pentadecanoxy{polypropylene glycol-polybutylene glycol-polyethylene glycol}mono(meth)acrylate, hexadecanoxypolypropylene glycol mono(meth)acrylate, hexadecanoxy{polypropylene glycol-polyethylene glycol}(meth)acrylate, hexadecanoxypolybutylene glycol mono(meth)acrylate, hexadecanoxy{polybutylene glycol-polyethylene glycol}mono(meth)acrylate, hexadecanoxy{polypropylene glycol-polybutylene glycol}mono(meth)acrylate, hexadecanoxy{polypropylene glycol-polybutylene glycol-polyethylene glycol}mono(meth)acrylate, heptadecanoxypolypropylene glycol mono(meth)acrylate, heptadecanoxy{polypropylene glycol-polyethylene glycol}(meth)acrylate, heptadecanoxypolybutylene glycol mono(meth)acrylate, heptadecanoxy{polybutylene glycol-polyethylene glycol}mono(meth)acrylate, heptadecanoxy{polypropylene glycol-polybutylene glycol}mono(meth)acrylate, heptadecanoxy{polypropylene glycol-polybutylene glycol-polyethylene glycol}mono(meth)acrylate, octadecanoxypolypropylene glycol mono(meth)acrylate, octadecanoxy{polypropylene glycol-polyethylene glycol}(meth)acrylate, octadecanoxypolybutylene glycol mono(meth)acrylate, octadecanoxy{polybutylene glycol-polyethylene glycol}mono(meth)acrylate, octadecanoxy{polypropylene glycol-polybutylene glycol}mono(meth)acrylate, octadecanoxy{polypropylene glycol-polybutylene glycol-polyethylene glycol}mono(meth)acrylate, nonadecanoxypolypropylene glycol mono(meth) acrylate, nonadecanoxy{polypropylene glycol-polyethylene glycol}(meth)acrylate, nonadecanoxypolybutylene glycol mono(meth)acrylate, octadecanoxy{polybutylene glycol-polyethylene glycol}mono(meth)acrylate, nonadecanoxy{polypropylene glycol-polybutylene glycol}mono(meth)acrylate, nonadecanoxy{polypropylene glycol-polybutylene glycol-polyethylene glycol}mono(meth)acrylate, cyclopentoxypolypropylene glycol mono(meth)acrylate, cyclopentoxy[polypropylene glycol-polyethylene glycol](meth)acrylate, cyclopentoxypolybutylene glycol mono(meth)acrylate, cyclopentoxy{polybutylene glycol-polyethylene glycol}mono(meth)acrylate, cyclopentoxy{polypropylene glycol-polybutylene glycol}mono(meth)acrylate, cyclopentoxy{polypropylene glycol-polybutylene glycol-polyethylene glycol}mono(meth)acrylate, cyclohexoxypolypropylene glycol mono(meth) acrylate, cyclohexoxy{polypropylene glycol-polyethylene glycol}(meth)acrylate, cyclohexoxypolybutylene glycol mono(meth)acrylate, cyclohexoxy{polybutylene glycol-polyethylene glycol}mono(meth)acrylate, cyclohexoxy{polypropylene glycol-polybutylene glycol}mono(meth)acrylate, cyclohexoxy{polypropylene glycol-polybutylene glycol-polyethylene glycol}mono(meth)acrylate, allyloxypolypropylene glycol mono(meth)acrylate, allyloxy{polypropylene glycol-polyethylene glycol} (meth)acrylate, allyloxypolybutylene glycol mono (meth)acrylate, allyloxy{polybutylene glycol-polyethylene glycol}mono(meth)acrylate, allyloxy{polypropylene glycol-polybutylene glycol}mono(meth)acrylate, allyloxy{polypropylene glycol-polybutylene glycol-polyethylene glycol}mono (meth)acrylate, methallyloxypolypropylene glycol mono(meth)acrylate, methallyloxy{polypropylene glycol-polyethylene glycol}(meth)acrylate, methallyloxypolybutylene glycol mono(meth)acrylate, methallyloxy{polybutylene glycol-polyethylene glycol}mono(meth)acrylate, methallyloxy{polypropylene glycol-polybutylene glycol}mono(meth)acrylate, and methallyloxy{polypropylene glycol-polybutylene glycol-polyethylene glycol}mono(meth)acrylate.

The polyalkylene glycols in the braces ({ }) may be in the random or block addition mode.

The polyalkylene glycol ester monomer (II) to be used in the practice of the present invention is represented by the above general formula (2).

In case two or more species of the oxyalkylene groups represented by —($R^5O$)— in the above general formula (2) are present in one and the same molecule of the polyalkylene glycol ester monomer (II), the oxyalkylene group represented by —($R^5O$)— may constitute the random, block, alternating or like addition mode. For instance, when ethylene oxide and one or more alkylene oxides containing 3 to 18 carbon atoms are present, or two or more alkylene oxides containing 3 to 18 carbon atoms are added in the segment formed by addition of alkylene oxides containing 3 to 18 carbon atoms, the addition mode may be any of those mentioned above.

The majority of said $R^5O$ groups are oxyethylene groups.

In the above context, the "majority" in said $R^5O$ groups means that when a plurality of oxyalkylene group species are present in the monomer molecule, oxyethylene groups constitute the major part of those oxyalkylene groups which are present. In accordance with the present invention, when oxyethylene groups corresponds to the major part of the oxyalkylene groups represented by —($R^5O$)—, the effects of the structure in copolymer (A) can be obtained as resulting from the polyalkylene glycol ester monomer (II). Therefore, when oxyethylene groups are present in a proportion sufficient to produce such effects, said oxyethylene groups "constitute the major part" as mentioned above and can be the "majority" so referred to herein.

In the above polyalkylene glycol ester monomer (II), the "major part" referred to above is preferably not less than m×0.5, for instance, where m is the total number of oxyalkylene groups therein. When the proportion in question is less than m×0.5, the hydrophilicity is so poor that good flowability may possibly be unobtainable. More preferred is a proportion of not less than m×0.6, in particular not less than m×0.7, still more preferably not less than m×0.8, and most preferably not less than m×0.9.

Among the above oxyalkylene groups represented by —($R^5O$)—, the $C_3$–$C_{18}$ alkylene oxide to be added are not particularly restricted. Thus, for example, such alkylene oxides as propylene oxide, butylene oxide, isobutylene oxide, 1-butene oxide and 2-butene oxide may be used. These may be used singly or two or more of them may be used combinedly. Among them, the use of an adduct of an alkylene oxide containing 3 to 6 carbon atoms is preferred and the use of an adduct of propylene oxide or butylene oxide, containing 3 or 4 carbon atoms respectively, is more preferred. From the viewpoint of improved productivity of esterification with (meth)acrylic acid, it is preferred that said ethylene oxide-derived portion is added at the site of ester bonding with (meth)acrylic acid.

The number m of the oxyalkylene group represented by —($R^5O$)— is 2 to 300. The average number of moles of oxyethylene groups added is preferably not less than 2. When m is less than 2 or when the average number of moles of oxyethylene groups is less than 2, either sufficient hydrophilicity or sufficient steric hindrance to disperse cement particles may not be obtained, hence good flowability may not be obtained. On the other hand, m should be not more than 300, since otherwise the polymerizability of the monomer will be reduced. It is preferred that m be 10 to 250, more preferably 20 to 150. The number of moles of oxyethylene groups added is preferably 10 to 250, more preferably 20 to 150.

The above group $R^6$ is not particularly restricted but may be any hydrocarbon group containing 1 to 30 carbon atoms. Thus, for instance, such hydrocarbon groups containing 1 to 30 carbon atoms as alkyl, alkenyl and alkynyl and aromatic hydrocarbon groups can be used. When the number of carbon atoms is not less than 30, the hydrophobicity of copolymer (A) is so strong that good dispersibility cannot be obtained.

For attaining good dispersibility, said group $R^6$ is preferably a hydrocarbon group containing 1 to 20 carbon atoms, more preferably 1 to 10 carbon atoms, still more preferably 1 to 3 carbon atoms, in particular 1 or 2 carbon atoms. For fulfilling the good material separation preventing property, it is preferably a hydrocarbon group containing 4 to 20 carbon atoms, more preferably 4 or 5 carbon atoms. Further, among such hydrocarbon groups, straight chain saturated hydrocarbon groups, branched chain saturated hydrocarbon groups, straight chain unsaturated hydrocarbon groups and branched chain unsaturated hydrocarbon groups are preferably used.

The above polyalkylene glycol ester monomer (II) may be any one falling under the category defined hereinabove, without any particular restriction. Thus, there can be mentioned, for example, esterification products (2) of (meth) acrylic acid with alkoxypolyalkylene glycols derived from any of aliphatic alcohols containing 1 to 30 carbon atoms, such as methanol, ethanol, 1-propanol, 2-propanol, 1-butanol, 2-butanol, 1-pentanol, 2-pentanol, 3-pentanol, 1-hexanol, 2-hexanol, 3-hexanol, octanol, 2-ethyl-1-hexanol, nonyl alcohol, lauryl alcohol, cetyl alcohol and stearyl alcohol, alicyclic alcohols containing 3 to 30 carbon atoms, such as cyclohexanol, benzene ring-containing alcohols or phenols such as phenol, phenylmethanol (benzyl alcohol), methylphenol (cresol), p-ethylphenol, dimethylphenol (xylenol), p-tert-butylphenol, nonylphenol, dodecylphenol, phenylphenol, and naphthol, and alkenyl-containing alcohols containing 3 or 4 carbon atoms, such as allyl alcohol, methallyl alcohol and crotyl alcohol, said alkoxypolyalkylene glycols being formed by adding 2 to 300 moles of an alkylene oxide(s) containing 2 to 18 carbon atoms so that the average number of moles of ethylene oxide added may be not less than 50% of the average total number of moles of all alkylene oxides added.

As said esterification products (2), there may be mentioned, for example, those alkoxypolyethylene glycol (alkylene glycol containing 2 to 18 carbon atoms; not less than 50 mole percent of the alkylene glycol units being ethylene glycol units) (meth)acrylate esters which are given below:

Methoxypolyethylene glycol mono(meth)acrylate, methoxy{polyethylene glycol-(poly)propylene glycol}mono(meth)acrylate, methoxy{polyethylene glycol-(poly)butylene glycol}mono(meth)acrylate, methoxy{polyethylene glycol-(poly)propylene glycol-(poly)butylene glycol}mono(meth)acrylate, ethoxypolyethylene glycol mono(meth)acrylate, ethoxy{polyethylene glycol-(poly)propylene glycol}mono(meth)acrylate, ethoxy{polyethylene glycol-(poly)butylene glycol}mono(meth)acrylate, ethoxy{polyethylene glycol-(poly)propylene glycol-(poly)butylene glycol}mono(meth)acrylate, propoxypolyethylene glycol mono(meth)acrylate, propoxy{polyethylene glycol-(poly)propylene glycol}mono(meth)acrylate, propoxy{polyethylene glycol-(poly)butylene glycol}mono(meth)acrylate, propoxy{polyethylene glycol-(poly)propylene glycol-(poly)butylene glycol}mono(meth)acrylate, butoxypolyethylene glycol mono(meth)acrylate, butoxy{polyethylene glycol-(poly)propylene glycol}mono(meth)acrylate, butoxy{polyethylene glycol-(poly)butylene glycol}mono(meth)acrylate, butoxy{polyethylene glycol-(poly)propylene glycol-(poly)butylene glycol}mono(meth)acrylate, pentoxypolyethylene glycol mono(meth)acrylate, pentoxy{polyethylene glycol-(poly)propylene glycol}mono(meth)acrylate, pentoxy{polyethylene glycol-(poly)butylene glycol}mono(meth)acrylate, pentoxy{polyethylene glycol-(poly)propylene glycol-(poly)butylene glycol}mono(meth)acrylate, hexoxypolyethylene glycol mono(meth)acrylate, hexoxy{polyethylene glycol-(poly)propylene glycol}mono(meth)acrylate, hexoxy{polyethylene glycol-(poly)butylene glycol}mono(meth)acrylate, hexoxy{polyethylene glycol-(poly)propylene glycol-(poly)butylene glycol}mono(meth)acrylate, heptoxypolyethylene glycol mono(meth)acrylate, heptoxy{polyethylene glycol-(poly)propylene glycol}mono(meth)acrylate, heptoxy{polyethylene glycol-(poly)butylene glycol}mono(meth)acrylate, heptoxy{polyethylene glycol-(poly)propylene glycol-(poly)butylene glycol}mono(meth)acrylate, octoxypolyethylene glycol mono(meth)acrylate, octoxy{polyethylene glycol-(poly)propylene glycol}mono(meth)acrylate, octoxy{polyethylene glycol-(poly)butylene glycol}mono(meth)acrylate, octoxy{polyethylene glycol-(poly)propylene glycol-(poly)butylene glycol}mono(meth)acrylate, nonanoxypolyethylene glycol mono(meth)acrylate, nonanoxy{polyethylene glycol-(poly)propylene glycol}mono(meth)acrylate, nonanoxy{polyethylene glycol-(poly)butylene glycol}mono(meth)acrylate, nonanoxy{polyethylene glycol-(poly)propylene glycol-(poly)butylene glycol}mono(meth)acrylate, decanoxypolyethylene glycol mono(meth)acrylate, decanoxy{polyethylene glycol-(poly)propylene glycol}mono(meth)acrylate, decanoxy{polyethylene glycol-(poly)butylene glycol}mono(meth)acrylate, decanoxy{polyethylene glycol-(poly)propylene glycol-(poly)butylene glycol}mono(meth)acrylate, undecanoxypolyethylene glycol mono(meth)acrylate, undecanoxy{polyethylene glycol-(poly)propylene glycol}mono(meth)acrylate, undecanoxy{polyethylene glycol-(poly)butylene glycol}mono(meth)acrylate, undecanoxy{polyethylene glycol-(poly)propylene glycol-(poly)butylene glycol}mono(meth)acrylate, dodecanoxypolyethylene glycol mono(meth)acrylate, dodecanoxy{polyethylene glycol-(poly)propylene glycol}mono(meth)acrylate, dodecanoxy{polyethylene glycol-(poly)butylene glycol}mono(meth)acrylate, dodecanoxy{polyethylene glycol-(poly)propylene glycol-(poly)butylene glycol}mono(meth)acrylate, tridecanoxypolyethylene glycol mono(meth)acrylate, tridecanoxy{polyethylene glycol-(poly)propylene glycol}mono(meth)acrylate, tridecanoxy{polyethylene glycol-(poly)butylene glycol}mono(meth)acrylate, tridecanoxy{polyethylene glycol-(poly)propylene glycol-(poly)butylene glycol}mono(meth)acrylate, tetradecanoxypolyethylene glycol mono(meth)acrylate, tetradecanoxy{polyethylene glycol-(poly)propylene glycol}mono(meth)acrylate, tetradecanoxy{polyethylene glycol-(poly)butylene glycol}mono(meth)acrylate, tetradecanoxy{polyethylene glycol-(poly)propylene glycol-(poly)butylene glycol}mono(meth)acrylate, pentadecanoxypolyethylene glycol mono(meth)acrylate, pentadecanoxy{polyethylene glycol-(poly)propylene glycol}mono(meth)acrylate, pentadecanoxy{polyethylene glycol-(poly)butylene glycol}mono(meth)acrylate, pentadecanoxy{polyethylene glycol-(poly)propylene glycol-(poly)butylene glycol}mono(meth)acrylate,
hexadecanoxypolyethylene glycol mono(meth)acrylate, hexadecanoxy{polyethylene glycol-(poly)propylene glycol}mono(meth)acrylate, hexadecanoxy{polyethylene glycol-(poly)butylene glycol}mono(meth)acrylate, hexadecanoxy{polyethylene glycol-(poly)propylene glycol-(poly)butylene glycol}mono(meth)acrylate, heptadecanoxypolyethylene glycol mono(meth)acrylate, heptadecanoxy{polyethylene glycol-(poly)propylene glycol}mono(meth)acrylate, heptadecanoxy{polyethylene glycol-(poly)butylene glycol}mono(meth)acrylate, heptadecanoxy{polyethylene glycol-(poly)propylene glycol-(poly)butylene glycol}mono(meth)acrylate, octadecanoxypolyethylene glycol mono(meth)acrylate, octadecanoxy{polyethylene glycol-(poly)propylene glycol}mono(meth)acrylate, octadecanoxy{polyethylene glycol-(poly)butylene glycol}mono(meth)acrylate, octadecanoxy{polyethylene glycol-(poly)propylene glycol-(poly)butylene glycol}mono(meth)acrylate,
nonadecanoxypolyethylene glycol mono(meth)acrylate, nonadecanoxy{polyethylene glycol-(poly)propylene glycol}mono(meth)acrylate, nonadecanoxy{polyethylene glycol-(poly)butylene glycol}mono(meth)acrylate, nonadecanoxy{polyethylene glycol-(poly)propylene glycol-(poly)butylene glycol}mono(meth)acrylate, cyclopentoxypolyethylene glycol mono(meth)acrylate, cyclopentoxy{polyethylene glycol-(poly)propylene glycol}mono(meth)acrylate, cyclopentoxy{polyethylene glycol-(poly)butylene glycol}mono(meth)acrylate, cyclopentoxy{polyethylene glycol-(poly)propylene glycol-(poly)butylene glycol}mono(meth)acrylate, cyclohexoxypolyethylene glycol mono(meth)acrylate, cyclohexoxy{polyethylene glycol-(poly)propylene glycol}mono(meth)acrylate, cyclohexoxy{polyethylene glycol-(poly)butylene glycol}mono(meth)acrylate, cyclohexoxy{polyethylene glycol-(poly)propylene glycol-(poly)butylene glycol}mono(meth)acrylate,
phenoxypolyethylene glycol mono(meth)acrylate, phenoxy{polyethylene glycol-(poly)propylene glycol}mono(meth)acrylate, phenoxy{polyethylene glycol-(poly)butylene glycol}mono(meth)acrylate, phenoxy{polyethylene glycol-(poly)propylene glycol-(poly)butylene glycol}mono(meth)acrylate, (meth)allyloxypolyethylene glycol mono(meth)acrylate, (meth)allyloxy{polyethylene glycol-(poly)propylene glycol}mono(meth)acrylate, (meth)allyloxy{polyethylene glycol-(poly)butylene glycol}mono(meth)acrylate and (meth)allyloxy{polyethylene glycol-(poly)propylene glycol-(poly)butylene glycol}mono(meth)acrylate.

In the practice of the present invention, the monomer mixture (K) preferably comprises the above polyalkylene glycol ester monomer (I), two or more species of the above polyalkylene glycol ester monomer (II) which differ in m, and said carboxylic acid monomer (III).

Referring to the polyalkylene glycol ester monomer (II), the combination of said two or more species differing in m is not particularly restricted but, for instance, when a monomer (II-1) in which the average number of moles of the oxyalkylene groups added is $m_1$ and a monomer (II-2) in which the average number of moles of the oxyalkylene groups added is $m_2$ are used as the monomer (II) and when $m_1$ and $m_2$ are not equal to each other, it is preferred that the difference between $m_1$ in monomer (II-1) and $m_2$ in monomer (II-2) be increased with the increase in m in monomer (II).

As regards such difference between $m_1$ and $m_2$, it is preferred that the difference between $m_1$ and $m_2$ be not less than 3, for instance, irrespective of the values of $m_1$ and $m_2$. Further, it is preferred that the difference between $m_1$ and $m_2$ be not less than 5 when m is not less than 5, that the difference between $m_1$ and $m_2$ be not less than 10 when m is not less than 10, that the difference between $m_1$ and $m_2$ be not less than 15 when m is not less than 15, and that the difference between $m_1$ and $m_2$ be not less than 20 when m is not less than 20.

The above monomers (II-1) and (II-2) each is a composition comprising one single monomer species or two or more monomer species differing in the average number of moles of the oxyalkylene groups added. In cases where the average number of moles of the added oxyalkylene groups in each monomer species included in monomer (II-1) is smaller than the average number of the added oxyalkylene groups in any monomer species included in monomer (II-2), the combination of the above monomers (II-1) and (II-2) can be designed, for example, as shown below under (1) to (5):

(1) Combination of $m_1=2$ to 10 in monomer (II-1) and $m_2=13$ to 30 in monomer (II-2);
(2) Combination of $m_1=5$ to 20 in monomer (II-1) and $m_2=25$ to 60 in monomer (II-2);
(3) Combination of $m_1=10$ to 30 in monomer (II-1) and $m_2=40$ to 80 in monomer (II-2);
(4) Combination of $m_1=15$ to 40 in monomer (II-1) and $m_2=55$ to 100 in monomer (II-2);
(5) Combination of $m_1=25$ to 50 in monomer (II-1) and $m_2=70$ to 120 in monomer (II-2).

When the above monomer (II-1) includes at least two monomer species, the difference in the average number of moles of added oxyalkylene groups between said two or more monomer species is not particularly restricted. The same shall apply to the case where the above monomer (II-2) includes two or more monomer species.

By combining the above monomers (II-1) and (II-2) in the manner mentioned above, the monomer (II-1) smaller in the average number of the added oxyalkylene groups, the majority of which are oxyethylene groups, facilitates the copolymerization of the monomer (II-2) greater in the average number of moles of the added oxyalkylene groups with other monomers, hence the copolymerizability of (II-2) is improved, so that a copolymer (A) comprising the monomer (II-2) copolymerized to a sufficient extent together with the monomer (II-1) is obtained. In that case, it also becomes possible to readily copolymerize, in the copolymer (A), a monomer (II) having a sufficiently large number of moles of added oxyalkylene groups. By using such copolymer (A), it becomes possible for the cement additive of the present invention to give a cement composition capable of sufficiently producing the hydrophilicity and steric repulsion effects of the oxyalkylene groups comprising oxyethylene groups as the majority, allowing the cement composition to sufficiently show a dispersing capacity to thereby secure its flowability and workability even in the event of reduction of the addition amount of water, and realize improvements in durability and strength as resulting from water reduction, with reduced air entrained property.

The above monomers (I) and the above monomers (II) can be produced by esterification respectively as the esterification products (1) and esterification products (2) mentioned above. Such method of production is not particularly restricted but the monomers (I), for instance, can be produced by esterifying an alcohol mixture derived from aliphatic or alicyclic alcohols containing 4 to 30 carbon atoms by addition of an alkylene oxide(s) containing 2 to 18 carbon atoms (the majority of alkylene oxide(s) being an alkylene oxide(s) containing not less than 3 carbon atoms) with (1) (meth)acrylic acid, (2) (meth)acrylic anhydride or (3) a (meth)acryloyl halide, such as (meth)acryloyl chloride or with (4) a (meth)acrylate ester, such as methyl (meth)acrylate (transesterification). According to the above method (1), an alkoxypolyalkylene glycol (mainly derived from ethylene oxide) for preparing a monomer (II) and an alkoxypolyalkylene glycol (mainly derived from an alkylene oxide (s) containing not less than 3 carbon atoms) for preparing a monomer (I) maybe subjected, in admixture, to esterification with (meth)acrylic acid.

In producing the above monomers (I) and (II) by esterification, an alkoxypolyalkylene glycol (mainly derived from an alkylene oxide(s) containing not less than 3 carbon atoms) for preparing a monomer (I) and an alkoxypolyalkylene glycol (mainly derived from ethylene oxide) for preparing a monomer (II) each having a peroxide value of not more than 0.7 milliequivalent/kg are preferably used. A more preferred peroxide value is not more than 0.5 milliequivalent/kg, still more preferably not more than 0.3 milliequivalent/kg, most preferably not more than 0.1 milliequivalent/kg. When the peroxide value is higher than 0.7 milliequivalent/kg, a polymerization reaction may proceed during esterification to give a large amount of polymers.

Figure 2:
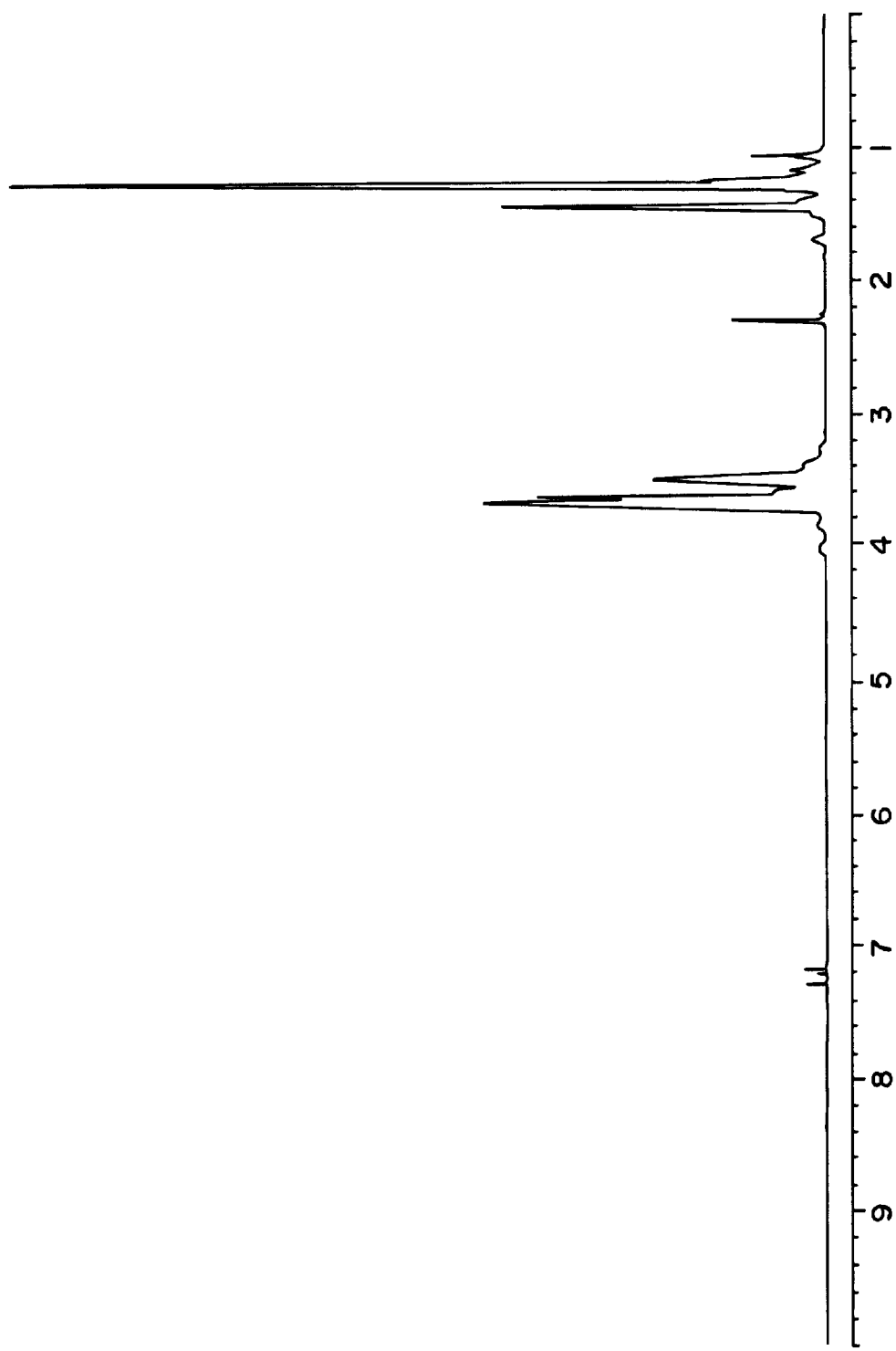
FIG. 2 is the $^1$H-NMR spectrum of an alcohol mixture (a-2).

As examples of the above-mentioned alcohol mixture derived from aliphatic or alicyclic alcohols containing 4 to 30 carbon atoms by addition of an alkylene oxide(s) containing 2 to 18 carbon atoms (the majority of alkylene oxide(s) is an alkylene oxide(s) containing not less than 3 carbon atoms), $^1$H-NMR spectra are shown in FIG. 1 and FIG. 2, said $^1$H-NMR spectra describing an alcohol mixture (a-1) derived from alcohols containing not less than 8 carbon atoms with an average number of carbon atoms of 18 by addition of 33.6 moles of propylene oxide and 5.5 moles of ethylene oxide and an alcohol mixture (a-2) derived from alcohols containing not less than 8 carbon atoms with an average number of carbon atoms of 18 by addition of 31.5 moles of propylene oxide and 6.5 moles of ethylene oxide.

The $^1$H-NMR measurement conditions used are described below.

Alcohol mixture (a-1): A 5% by weight solution of a sample in deuterated benzene was placed in an NMR tube with a diameter of 5 mm and the measurement was conducted on a Varian 400 MHz NMR measurement apparatus.

Alcohol mixture (a-2): A 5% by weight solution of a sample in deuterated toluene was placed in an NMR tube with a diameter of 5 mm and the measurement was conducted on a VARIAN 400 MHz NMR measurement apparatus.

The carboxylic acid monomer (III) to be used in the practice of the present invention is represented by the above general formula (3).

The metal atom M in the above general formula (3) is not particularly restricted but includes, among others, univalent metal atoms, for example alkali metal atoms such as lithium, sodium and potassium; bivalent metal atoms, for example alkaline earth metal atoms such as calcium and magnesium; and trivalent metal atoms such as aluminum and iron. The organic amine group is not particularly restricted but includes, among others, ethanolamine and triethylamine groups. These may be used singly or two or more of them may be used in combination. Further, the monomer (III) may contain an ammonium group.

The above carboxylic acid monomer (III) may be any one falling under the category defined above, without any particular restriction. Specifically, it includes, among others, acrylic acid and methacrylic acid; univalent metal salts, bivalent metal salts, ammonium salts and organic amine salts thereof. Among these, the use of acrylic acid as well as univalent metal salts, bivalent metal salts, ammonium salts and organic amine salts thereof, among others, is preferred from the viewpoint of cement dispersing and mortar kneading capacities.

In the practice of the present invention, it is preferred that the monomer mixture (K) further comprise a hydrophobic monomer (IV) having a solubility parameter value δ of not more than 20 MPa$^{1/2}$. It is also preferred that said hydrophobic monomer (IV) has no ester bonding within the molecule thereof. Accordingly, the hydrophobic monomer (IV) serves as a compatibilizing agent for the monomer (I) on the occasion of carrying out the polymerization reaction of the monomer mixture (K) in an aqueous medium and thus enables the monomer (I) to be uniformly copolymerized. As a result, the copolymer (A) obtained can be prevented from separating, hence the storage stability can be improved.

Said hydrophobic monomer (IV) may be used singly or two or more species thereof may be used combinedly.

Said solubility parameter value δ can be calculated according to the following formula (1):

$$\delta = \left( \frac{\sum niEi}{\sum niVi} \right)^{1/2} \quad (1)$$

using the values (E value: molar evaporation energy; V value: molar volume) given in Polymer Handbook, 4th edition, John Wiley & Sons, Inc., Chapter VII: Solubility Parameter Values, Table 3.

As examples of the above solubility parameter value δ, the E values (J/mol), V values (cm$^3$/mol) and δ values (MPa$^{1/2}$) for styrene, ethyl vinyl ether and methyl methacrylate are shown below in Table 1.

TABLE 1

|  | n | E (J/mol) | V (cm$^3$/mol) | δ (MPa$^{1/2}$) |
|---|---|---|---|---|
| Stylene |  |  |  |  |
| CH$_2$= | 1 | 4310 | 28.5 | 18.9 |
| —CH= | 1 | 4310 | 13.5 |  |
| Ph— | 1 | 31940 | 71.4 |  |
| Σ |  | 40560 | 113.4 |  |

TABLE 1-continued

| | n | E (J/mol) | V (cm³/mol) | δ (MPa^(1/2)) |
|---|---|---|---|---|
| Ethylvinylether | | | | |
| $CH_2=$ | 1 | 4310 | 28.5 | 15.1 |
| $-CH=$ | 1 | 4310 | 13.5 | |
| $-O-$ | 1 | 3350 | 3.8 | |
| $-CH_2-$ | 1 | 4940 | 16.1 | |
| $-CH_3$ | 1 | 4710 | 33.5 | |
| Σ | | 21620 | 95.4 | |
| Methyl methacylate | | | | |
| $CH_2=$ | 1 | 4310 | 28.5 | 18.3 |
| $>C=$ | 1 | 4310 | −5.5 | |
| $-COO-$ | 1 | 18000 | 18 | |
| $-CH_3$ | 2 | 9420 | 66 | |
| Σ | | 36040 | 107 | |

The hydrophobic monomer (IV) may be any one falling under the category defined above, without any particular restriction, and includes, among others, styrenes such as styrene, bromostyrene, chlorostyrene and methylstyrene; dienes such as 1,3-butadiene, isoprene and isobutylene; (meth)acrylic esters such as methyl (meth)acrylate, ethyl (meth)acrylate, butyl (meth)acrylate, pentyl (meth)acrylate, hexyl (meth)acrylate, decyl (meth)acrylate and lauryl (meth) acrylate; α-olefins such as hexene, heptene and decene; alkyl vinyl ethers such as methyl vinyl ether, ethyl vinyl ether and butyl vinyl ether; vinyl esters such as vinyl acetate; and allyl esters such as allyl acetate. Among them, the use of styrenes and alkyl vinyl ethers, which have no intramolecular ester bonding, is preferred.

Said monomer mixture (K) may further comprise a further monomer (V) other than said monomers (I), (II), (III) and (IV).

Said further monomer (V) is not particularly restricted but includes, among others, those monomers mentioned below. These may be used singly or two or more of them may be used combinedly.

Unsaturated dicarboxylic acids, such as maleic acid, fumaric acid, itaconic acid and citraconic acid, and univalent metal salts, bivalent metal salts, ammonium salts and organic amine salts or anhydrides thereof; half esters and diesters derived from the above unsaturated dicarboxylic acids and alcohols containing 1 to 22 carbon atoms; half amides and diamides derived from the above unsaturated dicarboxylic acids and amines containing 1 to 22 carbon atoms; half esters and diesters derived from the above unsaturated dicarboxylic acids and alkylpolyalkylene glycols derived from such alcohols or amines as mentioned above by addition of 1 to 300 moles of an oxyalkylene containing 2 to 4 carbon atoms; half esters and diesters derived from the above unsaturated dicarboxylic acids and glycols containing 2 to 4 carbon atoms or polyalkylene glycols derived from such glycols by addition of 2 to 300 moles, on an average; half amides derived from maleamic acid and glycols containing 2 to 4 carbon atoms or polyalkylene glycols derived from such glycols by addition of 2 to 300 moles, on an average; (poly)alkylene glycol di(meth) acrylates such as triethylene glycol di(meth)acrylate, (poly) ethylene glycol di(meth)acrylate, polypropylene glycol di(meth)acrylate, and (poly)ethylene glycol-(poly) propylene glycol di(meth)acrylate;

bifunctional (meth)acrylates such as hexanediol di(meth) acrylate, trimethylolpropane tri(meth)acrylate, and tri-methylolpropane di(meth)acrylate; (poly)alkylene glycol dimaleates such as triethylene glycol dimaleate and polyethylene glycol dimaleate; unsaturated sulfonic acids and derivatives thereof, such as vinylsulfonate, (meth)allylsulfonate, 2-(meth)acryloxyethylsulfonate, 3-(meth)acryloxypropylsulfonate, 3-(meth)acryloxy-2-hydroxypropylsulfonate, 3-(meth)acryloxy-2-hydroxypropylsulfophenyl ether, 3-(meth)acryloxy-2-hydroxypropyloxysulfobenzoate, 4-(meth) acryloxybutylsulfonate, (meth) acrylamidomethylsulfonic acid, (meth) acrylamidoethylsulfonic acid, 2-methylpropanesulfonic acid (meth)acrylamide and styrenesulfonic acid, as well as univalent metal salts, bivalent metal salts, ammonium salts and organic amine salts thereof;

unsaturated amides such as (meth)acrylamide, (meth) acrylalkylamides, N-methylol(meth)acrylamide and N,N-dimethyl(meth)acrylamide; allyl compounds such as allyl alcohol; unsaturated amino compounds such as dimethylaminoethyl (meth)acrylate; vinyl ethers and allyl ethers, such as methoxypolyethylene glycol monovinyl ether, polyethylene glycol monovinyl ether, methoxypolyethylene glycol mono(meth)allyl ether and polyethylene glycol mono(meth)allyl ether; esterification products derived from methacrylic acid and alkoxypolyalkylene glycols such as methoxypolyethylene glycol, ethoxypolyethylene glycol, propoxypolyethylene glycol, methoxypolyethylene glycol-polypropylene glycol, ethoxypolyethylene glycol-polypropylene glycol, and propoxypolyethylene glycol-polypropylene glycol.

The weight proportions of the monomers (I), (II), (III), (IV) and (V) in the above monomer mixture (K) (proportions of components in copolymer (A)) are not particularly restricted but preferably are as follows: monomers (I)/(II)/(III)/(IV)/(V)=0.01 to 50/1 to 98.99/98.99 to 1/0 to 30/0 to 50, more preferably 0.05 to 40/60 to 98.9/ 39.85 to 1/0.1 to 20/0 to 40, still more preferably 0.1 to 10/65 to 96.8/34.4 to 3/0.5 to 15/0 to 30, most preferably 0.2 to 4/75 to 95.7/23.8 to 4/1 to 10/0 to 10. The sum total of monomers (I), (II), (III), (IV) and (V) is 100% by weight.

The weight average molecular weight of the copolymer (A) of the present invention is not particularly restricted but is preferably 5,000 to 200,000, more preferably 10,000 to 150,000, still more preferably 10,000 to 100,000.

When the monomer weight proportions in monomer mixture (K) and/or the weight average molecular weight of copolymer (A) deviates from the respective range mentioned above, it may be impossible to obtain a cement additive showing a high water reducing effect and a reduced air entraining property.

Since the oxyalkylene groups, the majority of which are oxyalkylene groups containing not less than 3 carbon atoms, in the structural portion originating from the polyalkylene glycol ester monomer (II) in the copolymer (A) sufficiently produce an air entrained property reducing effect on cement compositions, the cement additive of the present invention can provide cured cement products with stable strength and durability. Unlike the conventional cement additives, it can provide cement compositions with a sufficient air entrained property reducing effect without particularly adding an antifoam. Furthermore, the copolymer (A) will not undergo phase separation, so that it can fully produce its effects without becoming heterogeneous during storage or in the step of adding it to cement compositions.

Furthermore, the copolymer (A) can be sufficiently adsorbed on cement particles and, owing to the hydrophilicity and steric repulsion effect of the oxyalkylene groups, the majority of which are oxyethylene groups, in the structural portion originating from the polyalkylene glycol ester monomer (II), can improve the dispersibility of cement particles by preventing them from aggregating together. Therefore, even when the addition amount of water is lowered, it can adjust the amount of air to an adequate amount while providing cement compositions with sufficient flowability, thus rendering the cement compositions excellent in workability and, at the same time, it can improve the durability, workability and strength of the cement compositions by its water reducing effect and owing to the presence of an adequate amount of air as caused thereby.

Furthermore, owing to the synergy between the oxyalkylene groups, the majority of which are oxyalkylene groups containing not less than 3 carbon atoms, and the oxyalkylene groups, the majority of which are oxyethylene groups, it can render cement compositions excellent in dispersion retaining property.

The method of polymerization for obtaining the copolymer (A) of the present invention is not particularly restricted. For example, the polymerization can be carried out using the above monomer mixture (K) and a polymerization initiator in the manner known in the art, for example in the manner of solution polymerization or bulk polymerization.

In the polymerization method for producing the copolymer (A) of the present invention, any polymerization initiator can be used without any particular restriction. Thus, as the initiator, there may be mentioned persulfate salts such as ammonium persulfate, sodium persulfate and potassium persulfate; hydrogen peroxide; azo compounds such as azobis-2-methylpropionamidine hydrochloride and azobisisobutyronitrile; peroxides such as benzoyl peroxide, lauroyl peroxide and cumene hydroperoxide; and so forth. Further, as the promoter which can be used in combination, there may be mentioned reducing agents such as sodium hydrogen sulfite, sodium sulfite, Mohr's salt, sodium pyrosulfite, formaldehyde sodium sulfoxylate and ascorbic acid; and amine compounds such as ethylenediamine, sodium ethylenediaminetetraacetate and glycine, among others. These polymerization initiators and promoters may be used singly or two or more of them may be used combinedly.

In the above polymerization, a chain transfer agent may be used where necessary.

Said chain transfer agent may be any of known ones, without any particular restriction. Thus, for instance, there may be mentioned mercaptopropionic acid, 2-ethylhexyl mercaptopropionate, 2-mercaptoethyl octanoate, 1,8-dimercapto-3,6-dioxaoctane, decanetrithiol, dodecylmercaptan, hexadecanethiol, decanethiol, carbon tetrachloride, carbon tetrabromide, α-methylstyrene dimer, terpinolene, α-terpinene, γ-terpinene, dipentene, 2-aminopropan-1-ol and the like. These may be used singly or two or more of them may be used combinedly.

The above polymerization may be carried out either batchwise or continuously. As the solvent which is used where necessary in the step of polymerization, any of known ones may be used without any particular restriction. For example, there may be mentioned water; alcohols such as methyl alcohol, ethyl alcohol and isopropyl alcohol; aromatic or aliphatic hydrocarbons such as benzene, toluene, xylene, cyclohexane and n-heptane; esters such as ethyl acetate; and ketones such as acetone and methyl ethyl ketone. These may be used singly or two or more of them may be used combinedly. Among them, one or more solvents selected from among water and lower alcohols containing 1 to 4 carbon atoms are preferably used from the viewpoint of solubility of the monomer mixture and the product polycarboxylic acid.

The method of producing a copolymer for use as a cement additive according to the present invention is a method of producing the above copolymer (A). According to said method, in producing the copolymer (A) by polymerizing the monomer mixture (K) comprising the above polyalkylene glycol ester monomer (I) of general formula (1), the above polyalkylene glycol ester monomer (II) of general formula (2), the above carboxylic acid monomer (III) of general formula (3), the polymerization reaction is effected by adding a polymerization initiator to a solution containing said monomer mixture (K).

In polymerizing said monomer mixture (K) in an aqueous medium, if the polymerization reaction is carried out by charging a reaction vessel with the aqueous medium and adding a polymerization initiator and the monomer mixture (K) to the reaction vessel, the monomer (I) in monomer mixture (K), which is hydrophobic, will cause ununiformity in the aqueous medium, so that the monomer (I) cannot be sufficiently copolymerized.

By effecting the polymerization reaction by adding a polymerization initiator to a solution containing the monomer mixture (K), it is now possible, even in the case of polymerization in an aqueous medium, to improve the copolymerizability of the monomer (I) in the monomer mixture (K) and thus copolymerize the monomer (I) sufficiently into the copolymer (A). Thereby, the effect of the structure of the monomer (I) in copolymer (A) in improving the storage stability of the polymer can be fully produced.

By saying that the polymerization reaction is effected by adding a polymerization initiator to a solution containing the monomer mixture (K), it is meant that the polymerization reaction is carried out by charging a reaction vessel with the monomer mixture (K) and adding a polymerization initiator into the reaction vessel.

The mode of polymerization in the production method of the present invention is not particularly restricted but includes, for example, the method comprising carrying out the polymerization reaction by charging a reaction vessel with the whole monomer mixture (K) and then adding a polymerization initiator to the reaction vessel and the method comprising carrying out the polymerization reaction by charging a reaction vessel with a part of the monomer mixture (K), then adding a polymerization initiator to the reaction vessel, together with the remaining monomer mixture (K).

In the above method of polymerization, the polymerization reaction is preferably carried out by adding a polymerization initiator dropwise gradually to the reaction vessel since, in that case, the product polymer can have a narrow (sharp) molecular weight distribution, hence the cement dispersing ability can be improved. Further, it is preferred that the polymerization reaction be carried out while maintaining the concentration of water in the reaction vessel at an amount not higher than 50%, more preferably not higher than 40%, still more preferably not higher than 30%, most preferably not higher than 20%, during polymerization, since, in that case, the copolymerizability of the monomer mixture (K) is improved and the product polymer acquires more improved storage stability.

In the above polymerization, the polymerization conditions (temperature etc.) can be adequately selected according to the mode of polymerization, solvent, polymerization initiator and chain transfer agent employed, without any particular restriction. As for the polymerization temperature, for instance, it is generally preferred that said temperature be within the range of 0 to 150° C.

The copolymer (A) obtained by the above polymerization method may be used as such as a main component of a cement admixture. If necessary, however, it may be used after neutralization with an alkaline substance.

Said alkaline substance is not particularly restricted but the use of, for example, hydroxides, chlorides, carbonates and other inorganic salts of univalent or bivalent metals; ammonia; organic amines and the like is preferred.

A cement additive comprising the polymer (B), in which a 0.1% by weight aqueous solution of the polymer (B) treated with ether has a surface tension of 0.1 to 50 mN/m and an ultraviolet transmittance at 600 nm of 30 to 100%, can cause cement compositions to show sufficient dispersibility and thus secure their flowability and workability even when the addition amount of water is reduced. It is therefore possible to realize improvements in durability and strength as a result of reductions in amount of water and at the same time acquire cement compositions with a reduced air entraining property. Said cement additive also falls within the scope of the present invention in accordance with another aspect thereof.

In said cement additive, the polymer (B) may be used as a single species or two or more polymer (B) species may be used in combination.

The content of the polymer (B) in said cement additive is not particularly restricted provided that it serves as the main component.

When the surface tension referred to above is less than 0.1 mN/m, it is difficult to prepare a desired polymer. When it is not less than 50 mN/m, the cement additive may possibly be insufficiently effective in reducing the air entraining property of cement compositions. When the ultraviolet transmittance at 600 nm as referred to above is less than 30%, the cement additive becomes unhomogeneous due to the presence of water-insoluble polymer species and fails to stably provide cement compositions with flowability and workability.

For causing the above cement additive to produce sufficient effects on cement compositions and making it easy to prepare the polymer (B), the surface tension is preferably 1 to 48 mN/m, more preferably 3 to 45 mN/m, still more preferably 5 to 42 mN/m, most preferably 7 to 40 mN/m and the ultraviolet transmittance at 600 nm is preferably 35 to 100%, more preferably 40 to 100%, still more preferably 45 to 100%, most preferably 50 to 100%.

The surface tension can be determined, for example, under the measurement conditions mentioned below following the procedure mentioned below.

Measurement Conditions

Apparatus: BYK Chemie's Dynometer (trademark)

Ring: Platinum, 19.5 mm in diameter

Standard solution: Pure water, 72.8 mN/m (20° C.)

Table speed: 1.5 mm/min.

Temperature: 20° C.

Measurement Procedure (1) In the manner of pretreatment for preparing the aqueous solution of polymer (B), an aqueous solution of the polymer (B) is evaporated to dryness under reduced pressure and then the polymer (B) is subjected to Soxhlet extraction using an ether solvent to remove the ether-soluble fraction. Then, the 0.1% by weight aqueous solution is prepared.

(2) The platinum ring thoroughly cleaned is immersed in the standard solution (pure water) to a depth of 3 mm, and the table supporting the standard solution is lowered at a rate of 1.5 mm/min.

(3) Calibration is conducted using the maximum value indicated by the Dynometer as the surface tension of water (72.8 mN/m).

(4) Then, the platinum ring thoroughly cleaned is immersed in the 0.1% by weight solution of polymer (B) treated with ether to a depth of 3 mm, and the table supporting the standard solution is lowered at a rate of 1.5 mm/min. The maximum value indicated by the Dynometer is taken as the surface tension of the 0.1% by weight aqueous solution of polymer (B).

The ultraviolet transmittance at 600 nm can be determined, for example, under the conditions mentioned below and following the procedure mentioned below.

Measurement Conditions

Apparatus: Shimadzu model UV-1200 (trademark)

Cell: TOP's quartz cell 1160-01 (trademark; path length 1 cm)

Temperature: 20° C.

Procedure (1) In the manner of pretreatment for preparing the aqueous solution of polymer (B), an aqueous solution of the polymer (B) is evaporated to dryness under reduced pressure and then the polymer (B) is subjected to Soxhlet extraction using an ether solvent to remove the ether-soluble fraction. Then, the 0.1% by weight aqueous solution of polymer (B) treated with ether is prepared.

(2) The 0.1% by weight aqueous solution of polymer (B) treated with ether is thoroughly stirred and then gently transferred to the measurement cell.

(3) Then, the measurement is performed while scanning in the wavelength range of 200 nm to 1100 nm (resolution: 1 nm). The transmittance at 600 nm is recorded as the ultraviolet transmittance at 600 nm.

For the cement additive comprising the polymer (B) to produce its effects more satisfactorily, it is preferred that the polymer (B), when a 10% by weight aqueous solution of said polymer (B) treated with ether is filtered through a filter with a pore size of 0.45 $\mu$m, give 0 to 1.3% by weight of a solid matter on the filter based on the weight of the non-volatile matter in the aqueous solution before filtration.

When the weight proportion of the solid on the filter after filtration of the 10% by weight aqueous solution of the polymer (B) treated with ether through a filter with a pore size of 0.45 $\mu$m is not less than 1.3% by weight relative to the non-volatile matter content in the aqueous solution before filtration, the cement additive will become heterogeneous due to the presence of water-insoluble polymer species and may possibly fail to stably provide cement compositions with flowability and workability. For causing said cement additives to produce sufficient effects on cement compositions and making it easy to prepare the polymer (B), the weight percentage of solids on the filter is preferably 0.01 to 1.0% by weight, more preferably 0.02 to 0.8% by weight, still more preferably 0.03 to 0.5% by weight, most preferably 0.04 to 0.3% by weight.

In view of (1) the merit of cost at the polymerization step of polymer (B) and (2) the problem about odor and the like, it is preferred that said polymer (B) is prepared by polymerization of the aqueous solution.

The weight proportion of solids remaining on the filter, namely the weight proportion of the solid on the filter after filtration of the 10% by weight aqueous solution of the polymer (B) treated with ether through a filter with a pore size of 0.45 $\mu$m, based on the non-volatile content in the aqueous solution before filtration, can be determined, for example, by the following procedure.

Measurement Method
(1) In the manner of pretreatment for preparing the aqueous solution of polymer (B), an aqueous solution of the polymer (B) is evaporated to dryness under reduced pressure and then the polymer (B) is subjected to Soxhlet extraction using an ether solvent to remove the ether-soluble fraction. Then, the 10% by weight aqueous solution of the polymer (B) treated with ether is prepared.
(2) The 10% by weight aqueous solution of polymer (B) treated with ether is filtered through a filter (product of GL Science; trademark "Chromatodisk 25A") with a pore size of 0.45 µm. The non-volatile matter weight in the aqueous solution of polymer (B) before filtration and the non-volatile matter weight in the filtrate are determined, and the weight proportion of solids remaining on the filter is calculated as follows:

$$X = \frac{A - B}{A} \times 100 \quad (2)$$

In the above formula (2), X represents the weight proportion (wt %) of solids remaining on the filter; A represents the weight of the non-volatile matter in the aqueous solution of polymer (B) before filtration; and B represents the weight of the non-volatile matter in the filtrate. The weights of non-volatile matter are determined by taking 1 g of the aqueous solution of polymer (B) treated with ether before filtration and 1 g of the filtrate, respectively, and evapoarating to dryness at 130° C. for 1 hour under nitrogen, followed by weighing.

As said polymer (B), any one satisfying the requirements mentioned above may be used, without any particular restriction. Thus, for example, there may be mentioned polycarboxylic acid polymers produced by adequately selecting or adjusting those polymer elements which are involved in or related to the surface tension and ultraviolet transmission of the 0.1% by weight aqueous solution of polymer (B) treated with ether and the weight proportion of solids remaining on the filter after filtration of the 10% by weight aqueous polymer solution.

The polymer elements which are involved in or related to the surface tension and ultraviolet transmission of the 0.1% by weight aqueous solution and the weight proportion of solids remaining on the filter after filtration of the 10% by weight aqueous solution of polymer (B) treated with ether are not particularly restricted but includes, among others, those elements which are concerned with the characteristics of the polymer, such as the structure of each monomer constituting the polymer, the average number of moles of an oxyalkylene group added in said monomer, the combination of monomers, the copolymerization ratio between the monomers, the weight average molecular weight (Mw) of the polymer, and so forth.

The cement additive of the present invention can be used by adding to a cement composition, such as paste, mortar, concrete or the like.

Said cement composition is not particularly restricted but includes those in general use which contain cement, water, fine aggregate, coarse aggregate and so forth. A fine powder, such as fly ash, blast furnace slag, silica fume or limestone in finely divided form, may be incorporated therein.

Said cement is not particularly restricted but includes, among others, ordinary, high early strength, ultra high early strength, moderate heat, white or like portland cement; and blended portland cement species such as alumina cement, fly ash cement, blast furnace cement and silica cement.

The proportion of said cement and the unit water content per 1 m³ of concrete are not particularly restricted. For producing high durability and high strength concrete, for instance, the unit water content is preferably 100 to 185 kg/M³, more preferably 120 to 175 kg/M³, and the water/cement ratio is preferably 10 to 70%, more preferably 20 to 65%.

The method of addition and the addition amount of the cement additive of the present invention are not particularly restricted. As regards the addition amount, it is preferred that the copolymer (A) of the present invention amount to 0.01 to 10% by weight relative to the whole cement weight. If the addition amount is less than 0.01% by weight, insufficient performance characteristics may result. If it is in excess of 10% by weight, the economy will be poor. Said weight percentage values are on the solids basis.

The cement additive of the present invention can be used in combination with any of the conventional cement dispersing agents.

Said cement dispersing agent is not particularly restricted but includes the following:

Ligninsulfonates; polyol derivatives; naphthalenesulfonic acid-formaldehyde condensates; melaminesulfonic acid-formaldehyde condensates; polystyrenesulfonic acid salts; aminosulfonic acid compounds such as aminoarylsulfonic acid-phenol-formaldehyde condensates, as described in JP Kokai H01-113419; cement dispersants comprising, as component (a), a copolymer of a polyalkylene glycol mono(meth)acrylate compound and a (meth)acrylic acid compound and/or a salt of said copolymer, as component (b), a copolymer of a polyalkylene glycol mono(meth)allyl ether compound and maleic anhydride and/or a hydrolyzate of said copolymer and/or a salt thereof and, as component (c), a copolymer of a polyalkylene glycol mono(meth)allyl ether compound and the maleic acid ester of a polyalkylene glycol compound, and/or a salt thereof, as described in JP Kokai H07-267705; concrete additives comprising, as component A, a copolymer of a polyalkylene glycol (meth)acrylate and (meth)acrylic acid (or a salt thereof), as component B, a specific polyethylene glycol-polypropylene glycol compound and, as component C, a specific surfactant, as described in JP 2508113; copolymers of olyethylene(propylene) glycol (meth)acrylate or polyethylene(propylene) glycol mono(meth)allyl ether, (meth)allylsulfonic acid (or a salt thereof) and (meth)acrylic acid (or a salt thereof), as described in Japanese Kokai Publication Sho-62-216950;

copolymers of polyethylene(propylene) glycol (meth)acrylate, (meth)allylsulfonic acid (or a salt thereof) and (meth)acrylic acid (or a salt thereof), as described in JP Kokai H01-226757; copolymers comprising polyethylene(propylene) glycol (meth)acrylate, (meth)allylsulfonic acid (or a salt thereof) or p-(meth)allyloxybenzenesulfonic acid (or a salt thereof) and (meth)acrylic acid (or a salt thereof), as described in Japanese Kokoku Publication Hei-05-36377; copolymers of polyethylene glycol mono(meth) allyl ether and maleic acid (or a salt thereof), as described in JP Kokai H04-149056; copolymers of polyethylene glycol (meth)acrylate, (meth)allylsulfonic acid (or a salt thereof), (meth)acrylic acid (or a salt thereof), an alkanediol mono(meth)acrylate, a polyalkylene glycol mono(meth)acrylate and an α, β-unstated monomer having an amide group within the molecule, as described in JP Kokai H05-170501; copolymers of polyethylene glycol mono(meth)allyl ether, polyethylene glycol mono(meth)acrylate, an alkyl (meth)

acrylate, (meth)acrylic acid (or a salt thereof) and (meth)allylsulfonic acid (or a salt thereof) or p-(meth)allyloxybenzenesulfonic acid (or a salt thereof), as described in JP Kokai H06-191918; copolymers of an alkoxypolyalkylene glycol monoallyl ether and maleic anhydride, or hydrolyzates thereof, or salts thereof, as described in JP Kokai H05-43288; copolymers of polyethylene glycol monoallyl ether, maleic acid and a monomer copolymerizable with these monomers, or salts thereof, or esters thereof, as described in Japanese Kokoku Publication Sho-58-38380;

copolymers of a polyalkylene glycol mono(meth)acrylate monomer, a (meth)acrylic acid monomer and a monomer copolymerizable with these monomers, as described in Japanese Kokoku Publication Sho-59-18338; copolymers comprising a sulfo-containing (meth)acrylate and a monomer coplymerizable therewith as necessary, or salts thereof, as described in Japanese Kokai Publication Sho-62-119147; esterification reaction products from a copolymer of an alkoxypolyalkylene glycol monoallyl ether and maleic anhydride and an alkenyl-terminated polyoxyalkylene derivative, as described in JP Kokai H06-271347; esterification reaction products from a copolymer of an alkoxypolyalkylene glycol monoallyl ether and maleic anhydride and a hydroxy-terminated polyoxyalkylene derivative, as described in JP Kokai H06-298555; polycarboxylic acids (or salts thereof), such as copolymers or salts thereof and like, comprising alkenyl ether monomer derived from a specific unsaturated alcohol, such as 3-methyl-3-buten-1-ol, by addition of ethylene oxide, an unsaturated carboxylic acid monomer and a monomer copolymerizable with these, as described in JP kokai S62-68806. These cement dispersing agents may be used singly or two or more of them may be used combinedly.

In case of combined use with said cement dispersing agent, the weight ratio between the cement additive of the present invention and said cement dispersing agent is preferably within the range of 5:95 to 95:5, more preferably 10:90 to 90:10, although said ratio cannot be definitely determined but may vary according to the cement dispersing agent species and mix formulation employed, the test conditions and other factors.

Furthermore, the cement additives of the present invention can be used in combination with some other cement additives. Said other cement additives are not particularly restricted but include, among others, those known other cement additives which are mentioned below:

(1) Water-soluble macromolecular substances; unsaturated carboxylic acid polymers such as polyacrylic acid (sodium salt), polymethacrylic acid (sodium salt), polymaleic acid (sodium salt) and acrylic acid-maleic acid copolymer sodium salt; polyoxyethylene or polyoxypropylene polymers or copolymers thereof, such as polyethylene glycol and polypropylene glycol; nonionic cellulose ethers such as methylcellulose, ethylcellulose, hydroxymethylcellulose, hydroxyethylcellulose, carboxymethylcellulose, carboxyethylcellulose and hydroxypropylcellulose; polysaccharides produced by microbial fermentation, such as yeast glucans, xanthan gum, β-1,3-glucans (which may be straight-chained or branched; e.g. curdlan, paramylum, pachyman, scleroglucan, laminaran); polyacrylamide; polyvinyl alcohol; starch; starch phosphate; sodium alginate; gelatin; amino-containing acrylic acid copolymers and quaternization products derived therefrom; and the like;

(2) Polymer emulsions; copolymers of various vinyl monomers such as alkyl (meth)acrylates; and the like;

(3) Retarders; oxycarboxylic acids (or salts thereof) and inorganic or organic salts, such as gluconic acid, glucoheptonic acid, arabonic acid, malic acid and citric acid, and sodium, potassium, calcium, magnesium, ammonium and triethanolamine salts thereof; saccharides, for example monosaccharides, disaccharides, trisaccharides and like oligosaccharides, such as glucose, fructose, galactose, saccharose, xylose, apiose and ribose, oligosaccharides such as dextrin, polysaccharides such as dextran, molasses and like mixtures containing these; sugar alcohols such as sorbitol; magnesium fluorosilicate; phosphoric acid and salts thereof or borate esters; aminocarboxylic acids and salts thereof; alkali-soluble proteins; humic acid; tannic acid; phenols; polyhydric alcohols such as glycerol; phosphonic acids and derivatives thereof, such as aminotri(methylenephosphonic acid), 1-hydroxyethylidene-1,1-diphosphonic acid, ethylenediaminetetra(methylenephosphonic acid), diethylenetriaminepenta (methylenephosphonic acid) and alkali metal salts and alkaline earth metal salts of these; and the like;

(4) Accelerators or high-early-strength agents; soluble calcium salts such as calcium chloride, calcium nitrite, calcium nitrate, calcium bromide and calcium iodide; chlorides such as iron chloride and magnesium chloride; sulfate salts; potassium hydroxide; sodium hydroxide; carbonate salts; thiosulfate salts; formic acid and formate salts such as calcium formate; alkanolamines; alumina cement; calcium aluminosilicate; and the like;

(5) Mineral oil-based antifoaming agents; kerosene, liquid paraffin, etc.;

(6) Fat- or oil-based antifoaming agents; animal/vegetable oils, sesame oil, castor oil, alkylene oxide adducts derived from these, and the like;

(7) Fatty acid-based antifoaming agents; oleic acid, stearic acid, alkylene oxide adducts derived from these, and the like;

(8) Fatty acid ester-based antifoaming agents; glycerol monoricinolate, alkenylsuccinic acid derivatives, sorbitol monolaurate, sorbitol trioleate, natural waxes, etc.;

(9) Oxyalkylene antifoaming agents; polyoxyalkylenes such as (poly)oxyethylene-(poly)oxypropylene adducts; (poly)oxyalkyl ethers such as diethylene glycol heptyl ether, polyoxyethylene oleyl ether, polyoxypropylene butyl ether, polyoxyethylene-polyoxypropylene 2-ethylhexyl ether and oxyethylene-oxypropylene adducts of higher alcohols containing 12 to 14 carbon atoms; (poly)oxyalkylene (alkyl)aryl ethers such as polyoxypropylene phenyl ether and polyoxyethylene nonylphenyl ether; acetylene ethers derived from acetylene alcohol by addition polymerization of an alkylene oxide, such as 2,4,7,9-tetramethyl-5-decyne-4,7-diol, 2,5-dimethyl-3-hexyne-2,5-diol and 3-methyl-1-butyn-3-ol; (poly)oxyalkylene fatty acid esters such as diethylene glycol oleate, diethylene glycol laurate and ethylene glycol distearate; (poly)oxyalkylenesorbitan fatty acid esters such as polyoxyethylenesorbitan monolaurate and polyoxyethylenesorbitan trioleate; (poly)oxyalkylene alkyl(aryl) ether sulfate ester salts such as sodium polyoxypropylenemethyl ether sulfate and sodium polyoxyethylene dodecylphenol ether sulfate; (poly)oxyalkylenealkyl phosphate esters such as (poly)oxyethylenestearyl phosphate; (poly)oxyalkylenealkylamines such as polyoxyethylenelaurylamine; polyoxyalkyleneamides; etc.;

(10) Alcohol antifoaming agents; octyl alcohol, hexadecyl alcohol, acetylene alcohol, glycols, etc.;

(11) Amide antifoaming agents; acrylate polyamines etc.;
(12) Phosphate ester antifoaming agents; tributyl phosphate, sodium octyl phosphate, etc.;
(13) Metal soap antifoaming agents; aluminum stearate, calcium oleate, etc.;
(14) Silicone antifoaming agents; dimethylsilicone oils, silicone pastes, silicone emulsions, organic modified polysiloxanes (polyorganosiloxanes such as dimethylpolysiloxane), fluorosilicone oils, etc.;
(15) AE (air-entraining) agents; resin soaps, saturated or unsaturated fatty acids, sodium hydroxystearate, lauryl sulfate, ABSs (alkylbenzenesulfonates), LAS (linear alkylbenzenesulfonates), alkanesulfonates, polyoxyethylene alkyl(phenyl) ethers, polyoxyethylene alkyl(phenyl) ether sulfates and salts thereof, polyoxyethylene alkyl (phenyl) ether phosphates and salts thereof, proteinous materials, alkenylsulfosuccinic acids, α-olefinsulfonates, etc.;
(16) Other surfactants; polyalkylene oxide derivatives produced by addition of not less than 10 moles of an alkylene oxide, such as ethylene oxide and/or propylene oxide to monohydric aliphatic alcohol containing 6 to 30 carbon atoms, such as octadecyl alcohol or stearyl alcohol, a monohydric alicyclic alcohol containing 6 to 30 carbon atoms, such as abietyl alcohol, a monomercaptan containing 6 to 30 carbon atoms, such as dodecyl mercaptan, an alkylphenol containing 6 to 30 carbon atoms, such as nonylphenol, an amine containing 6 to 30 carbon atoms, such as dodecylamine, or a carboxylic acid containing 6 to 30 carbon atoms, such as lauric acid or stearic acid; alkyl diphenyl ether sulfonate salts containing two sulfo-containing phenyl groups, which may have an alkyl or alkoxy group as a substituent, bound together by ether bonding; various anionic surfactants, various cationic surfactants such as alkylamine acetates and alkyltrimethylammonium chlorides; various nonionic surfactants; various amphoteric surfactants; and the like;
(17) Water-proof agents; fatty acids (salts), fatty acid esters, fats and oils, silicones, paraffins, asphalts, waxes, etc.;
(18) Rust inhibitors; nitrite salts, phosphate salts, zinc oxide, etc.;
(19) Crack inhibitors; polyoxyalkylene alkyl ethers; alkanediols such as 2-methyl-2,4-pentanediol; etc.;
(20) Expansive admixtures; ettringite materials, coals, etc.

As other known cement additives, there may be mentioned cement wetting agents, thickening agents, separation inhibitors, flocculants, agents to reduce shrinkage upon drying, agents to increase strength, self-leveling agents, rust inhibitors, color difference agents, antifungal agents, blast furnace slag, fly ash, cinder ash, clinker ash, husk ash, silica fume, silica powder, gypsum and so forth. These known cement additives may be used singly or two or more of them may be used combinedly.

The cement additives of the present invention may be used in combination not only with said known cement dispersing agent or cement additives but also with additives capable of improving the dispersibility and/or antifoaming property of the cement composition.

Although the method of adding such cement additives and/or cement dispersing agent to the cement composition is not particularly restricted, it is preferred that the cement additives and cement dispersing agent be added in the form of a cement admixture prepared by blending them for facilitating the addition thereof to the cement composition.

Such cement admixture preferably comprises an air entraining agent together with the cement additive of the present invention. In this manner, it becomes possible to reduce the air content in the cement composition to a sufficient extent by means of the cement additive of the present invention and adjust the air content by means of the air entraining agent. The thus-realized proper content of entrained air in the cement composition contributes toward an improvement in flowability of the cement composition, since said air occurs in the form of minute cells in the cement composition. As a result, the durability, strength and other performance characteristics of the cured product are also improved. In an aspect, the present invention is concerned with such a cement admixture.

The cement composition containing the cement admixture of the present invention is excellent in flowability and flowability retention and therefore can improve the workability through an improvement in water reducing ratio. In addition, it has an appropriate level of air entraining property, so that it can provide cured cement products with stable strength and improved durability.

BEST MODES FOR CURRYING OUT THE INVENTION

The following examples illustrate the present invention in further detail. They are, however, by no means limitative of the scope of the present invention. In the example, "%" means "% by weight", unless otherwise specified.

PRODUCTION EXAMPLE 1

A glass reaction vessel equipped with a thermometer, stirrer, dropping funnel, nitrogen inlet tube and reflux condenser was charged with 100.87 g of methanol. The reaction vessel was then purged with nitrogen under stirring, and the contents were heated to 60° C. under nitrogen. Then, a monomer solution (169.5 g) composed of 111.18 g of methoxypolyethylene glycol monomethacrylate (average number of moles of ethylene oxide added: 23), 1.41 g of butoxypolypropylene glycol monomethacrylate (average number of moles of propylene oxide added: 20), 22.41 g of methacrylic acid, 33.41 g of methanol and 0.77 g of 3-mercaptopropionic acid (as chain transfer agent), and a methanol solution (30 g) of 1.55 g of azobisisobutyronitrile were added dropwise over 4 hours and 5 hours, respectively. Thereafter, the temperature was still maintained at 60° C. for an hour to drive the polymerization reaction to completion. The methanol was distilled off, water was added and, after neutralization with an aqueous solution of sodium hydroxide, a copolymer (1) of the present invention was obtained in the form of an aqueous solution thereof with a weight average molecular weight of 25,600.

PRODUCTION EXAMPLE 2

A glass reaction vessel equipped with a thermometer, stirrer, dropping funnel, nitrogen inlet tube and reflux condenser was charged with 100.87 g of methanol. The reaction vessel was then purged with nitrogen under stirring, and the contents were heated to 60° C. under nitrogen. Then, a monomer solution (169.1 g) composed of 111.18 g of methoxypolyethylene glycol monomethacrylate (average number of moles of ethylene oxide added: 23), 1.41 g of nonyloxypolypropylene-polyethylene glycol monomethacrylate (average number of moles of propylene oxide added: 20; average number of moles of ethylene oxide added: 3), 22.41 g of methacrylic acid, 33.41 g of methanol and 0.38 g of 3-mercaptopropionic acid (as chain transfer agent), and a methanol solution (30 g) of 1.55 g of azobisisobutyronitrile were added dropwise over 4 hours and 5 hours, respectively. Thereafter, the temperature was still maintained at 60° C. for an hour to drive the polymerization reaction to completion. The methanol was distilled off, water was added and, after neutralization with an aqueous solution of sodium hydroxide, a copolymer (2) of the present invention was obtained in the form of an aqueous solution thereof with a weight average molecular weight of 32,700.

PRODUCTION EXAMPLE 3

A glass reaction vessel equipped with a thermometer, stirrer, dropping funnel, nitrogen inlet tube and reflux condenser was charged with 106.07 g of methoxypolyethylene glycol monomethacrylate (average number of moles of ethylene oxide added: 25), 0.69 g of heptadecanoxypolypropylene glycol-polyethylene glycol monomethacrylate (average number of moles of propylene oxide added: 24; average number of moles of ethylene oxide added: 3), 4.16 g of methyl methacrylate, 22.08 g of methacrylic acid, 34.21 g of water and 1.37 g of 3-mercaptopropionic acid, the reaction vessel was purged with nitrogen under stirring, and the contents were heated to 80° C. under nitrogen. Then, an aqueous solution (22.38 g) containing 6.87% by weight of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (3) of the present invention was obtained in the form of an aqueous solution thereof with a weight average molecular weight of 23,400.

PRODUCTION EXAMPLE 4

A glass reaction vessel equipped with a thermometer, stirrer, dropping funnel, nitrogen inlet tube and reflux condenser was charged with 163.09 g of methoxypolyethylene glycol monomethacrylate (average number of moles of ethylene oxide added: 25), 1.09 g of heptadecanoxypolypropylene glycol-polyethylene glycol monomethacrylate (average number of moles of propylene oxide added: 24; average number of moles of ethylene oxide added: 3), 10.95 g of ethyl vinyl ether, 34.86 g of methacrylic acid, 49.22 g of water and 2.28 g of 3-mercaptopropionic acid, the reaction vessel was purged with nitrogen under stirring, and the contents were heated to 60° C. under nitrogen. Then, anaqueous solution (35.22 g) containing 6.87% by weight of 2,2'-azobis(2-methylpropionamidine) dihydrochloride was added dropwise into the reaction vessel over 5 hours. Thereafter, the temperature was still maintained at 60° C. for an hour to drive the polymerization reaction to completion and, after neutralization to pH 7.0 with an aqueous solution of sodium hydroxide, a copolymer (4) of the present invention was obtained in the form of an aqueous solution thereof with a weight average molecular weight of 21,900.

PRODUCTION EXAMPLE 5

A glass reaction vessel equipped with a thermometer, stirrer, dropping funnel, nitrogen inlet tube and reflux condenser was charged with 106.07 g of methoxypolyethylene glycol monomethacrylate (average number of moles of ethylene oxide added: 25), 0.69 g of heptadecanoxypolypropylene glycol-polyethylene glycol monomethacrylate (average number of moles of propylene oxide added: 24; average number of moles of ethylene oxide added: 3), 4.16 g of styrene, 22.08 g of methacrylic acid, 34.21 g of water and 1.44 g of 3-mercaptopropionic acid, the reaction vessel was purged with nitrogen under stirring, and the contents were heated to 80° C. under nitrogen. Then, anaqueous solution (22.31 g) containing 6.87% by weight of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (5) of the present invention was obtained in the form of an aqueous solution thereof with a weight average molecular weight of 17,500.

PRODUCTION EXAMPLE 6

A glass reaction vessel equipped with a thermometer, stirrer, dropping funnel, nitrogen inlet tube and reflux condenser was charged with 87.16 g of methoxypolyethylene glycol monomethacrylate (average number of moles of ethylene oxide added: 90), 0.52 g of heptadecanoxypolypropylene glycol-polyethylene glycol monomethacrylate (average number of moles of propylene oxide added: 24; average number of moles of ethylene oxide added: 3), 12.25 g of methacrylic acid, 66.27 g of water and 1.92 g of 3-mercaptopropionic acid, the reaction vessel was purged with nitrogen under stirring, and the contents were heated to 80° C. under nitrogen. Then, an aqueous solution (34.41 g) containing 3.66% by weight of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (6) of the present invention was obtained in the form of an aqueous solution thereof with a weight average molecular weight of 56,200.

PRODUCTION EXAMPLE 7

A glass reaction vessel equipped with a thermometer, stirrer, dropping funnel, nitrogen inlet tube and reflux condenser was charged with 84.07 g of methoxypolyethylene glycol monomethacrylate (average number of moles of ethylene oxide added: 90), 0.52 g of heptadecanoxypolypropylene glycol-polyethylene glycol monomethacrylate (average number of moles of propylene oxide added: 24; average number of moles of ethylene oxide added: 3), 3.09 g of styrene, 11.81 g of methacrylic acid, 63.92 g of water and 1.92 g of 3-mercaptopropionic acid, the reaction vessel was purged with nitrogen under stirring, and the contents were heated to 80° C. under nitrogen. Then, anaqueous solution (31.42 g) containing 3.66% by weight of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (7) of the present invention was obtained in the form of an aqueous solution thereof with a weight average molecular weight of 54,400.

PRODUCTION EXAMPLE 8

A glass reaction vessel equipped with a thermometer, stirrer, dropping funnel, nitrogen inlet tube and reflux condenser was charged with 49.73 g of methoxypolyethylene glycol monomethacrylate (average number of moles of ethylene oxide added: 90), 49.73 g of methoxypolyethylene glycol monomethacrylate (average number of moles of ethylene oxide added: 25), 0.63 g of heptadecanoxypolypropylene glycol-polyethylene glycol monomethacrylate (average number of moles of propylene oxide added: 24; average number of moles of ethylene oxide added: 3), 16.95 g of methacrylic acid, 53.87 g of water and 3.33 g of 3-mercaptopropionic acid, the reaction vessel was purged with nitrogen under stirring, and the contents were heated to 80° C. under nitrogen. Then, an aqueous solution (22.76 g) containing 6.06% by weight of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (8) of the present invention was obtained in the form of an aqueous solution thereof with a weight average molecular weight of 18,000.

PRODUCTION EXAMPLE 9

A glass reaction vessel equipped with a thermometer, stirrer, dropping funnel, nitrogen inlet tube and reflux condenser was charged with 47.85 g of methoxypolyethylene glycol monomethacrylate (average number of moles of ethylene oxide added: 90), 47.85 g of methoxypolyethylene glycol monomethacrylate (average number of moles of ethylene oxide added: 25), 0.63 g of heptadecanoxypolypropylene glycol-polyethylene glycol monomethacrylate (average number of moles of propylene oxide added: 24; average number of moles of ethylene oxide added: 3), 3.75 g of styrene, 19.93 g of methacrylic acid, 51.37 g of water and 3.31 g of 3-mercaptopropionic acid, the reaction vessel was purged with nitrogen under stirring, and the contents were heated to 80° C. under nitrogen. Then, an aqueous solution (25.26 g) containing 5.46% by weight of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (9) of the present invention was obtained in the form of an aqueous solution thereof with a weight average molecular weight of 12,200.

PRODUCTION EXAMPLE 10

A glass reaction vessel equipped with a thermometer, stirrer, dropping funnel, nitrogen inlet tube and reflux condenser was charged with 101.06 g of isopropyl alcohol. The reaction vessel was then purged with nitrogen under stirring, and the contents were heated to 80° C. under nitrogen. Then, a monomer solution (168.75 g) composed of 111.88 g of methoxypolyethylene glycol monomethacrylate (average number of moles of ethylene oxide added: 23), 0.7 g of heptadecanoxypolypropylene-polyethylene glycol monomethacrylate (average number of moles of propylene oxide added: 24; average number of moles of ethylene oxide added: 3), 22.41 g of methacrylic acid, 31.62 g of isopropyl alcohol and 0.19 g of 3-mercaptopropionic acid (as chain transfer agent), and an isopropyl alcohol solution (30 g) of 1.55 g of 2,2'-azobis(2-methylpropionamidine) dihydrochloride were added dropwise over 4 hours and 5 hours, respectively. Thereafter, the temperature was still maintained at 80° C. for an hour to drive the polymerization reaction to completion. The isopropyl alcohol was distilled off, water was added and, after neutralization with an aqueous solution of sodium hydroxide, a copolymer (10) of the present invention was obtained in the form of an aqueous solution thereof with a weight average molecular weight of 21,300.

PRODUCTION EXAMPLE 11

A glass reaction vessel equipped with a thermometer, stirrer, dropping funnel, nitrogen inlet tube and reflux condenser was charged with 106.07 g of methoxypolyethylene glycol monomethacrylate (average number of moles of ethylene oxide added: 25), 0.69 g of heptadecanoxypolypropylene glycol-polyethylene glycol monomethacrylate (average number of moles of propylene oxide added: 24; average number of moles of ethylene oxide added: 3), 22.08 g of methacrylic acid, 34.21 g of water and 1.37 g of 3-mercaptopropionic acid, the reaction vessel was purged with nitrogen under stirring, and the contents were heated to 80° C. under nitrogen. Then, an aqueous solution (22.38 g) containing 6.87% by weight of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (11) of the present invention was obtained in the form of an aqueous solution thereof with a weight average molecular weight of 24,800.

PRODUCTION EXAMPLE 12

A glass reaction vessel equipped with a thermometer, stirrer, dropping funnel, nitrogen inlet tube and reflux condenser was charged with 174.04 g of methoxypolyethylene glycol monomethacrylate (average number of moles of ethylene oxide added: 25), 1.09 g of heptadecanoxypolypropylene glycol-polyethylene glycol monomethacrylate (average number of moles of propylene oxide added: 24; average number of moles of ethylene oxide added: 3), 10.95 g of ethyl vinyl ether, 34.86 g of methacrylic acid, 52.5 g of water and 2.28 g of 3-mercaptopropionic acid, the reaction vessel was purged with nitrogen under stirring, and the contents were heated to 60° C. under nitrogen. Then, an aqueous solution (35.22 g) containing 6.87% by weight of 2,2'-azobis(2-methylpropionamidine) dihydrochloride was added dropwise into the reaction vessel over 5 hours. Thereafter, the temperature was still maintained at 60° C. for an hour to drive the polymerization reaction to completion and, after neutralization to pH 7.0 with an aqueous solution of sodium hydroxide, a copolymer (12) of the present invention was obtained in the form of an aqueous solution thereof with a weight average molecular weight of 21,900.

PRODUCTION EXAMPLE 13

A glass reaction vessel equipped with a thermometer, stirrer, dropping funnel, nitrogen inlet tube and reflux condenser was charged with 116.03 g of methoxypolyethylene glycol monomethacrylate (average number of moles of ethylene oxide added: 25), 0.73 g of heptadecanoxypolypropylene glycol-polyethylene glycol monomethacrylate (average number of moles of propylene oxide added: 24; average number of moles of ethylene oxide added: 3), 7.03 g of methyl methacrylate, 23.24 g of methacrylic acid, 35.0 g of water and 1.28 g of 3-mercaptopropionic acid, the reaction vessel was purged with nitrogen under stirring, and the contents were heated to 80° C. under nitrogen. Then, an aqueous solution (23.72 g) containing 6.87% by weight of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (13) of the present invention was obtained in the form of an aqueous solution thereof with a weight average molecular weight of 25,700.

PRODUCTION EXAMPLE 14

A glass reaction vessel equipped with a thermometer, stirrer, dropping funnel, nitrogen inlet tube and reflux condenser was charged with 34.67 g of methoxypolyethylene glycol monomethacrylate (average number of moles of ethylene oxide added: 25), 0.93 g of heptadecanoxypolypropylene glycol-polyethylene glycol monomethacrylate (average number of moles of propylene oxide added: 24; average number of moles of ethylene oxide added: 3), 1.39 g of styrene, 7.36 g of methacrylic acid, 11.08 g of water and 0.49 g of 3-mercaptopropionic acid, the reaction vessel was purged with nitrogen under stirring, and the contents were heated to 80° C. under nitrogen.

Then, a monomer mixture composed of 69.33 g of methoxypolyethylene glycol monomethacrylate (average number of moles of ethylene oxide added: 25), 1.85 g of heptadecanoxypolypropylene glycol-polyethylene glycol monomethacrylate (average number of moles of propylene oxide added: 24; average number of moles of ethylene oxide added: 3), 2.77 g of styrene, 14.73 g of methacrylic acid, 22.15 g of water and 0.98 g of 3-mercaptopropionic acid, and 17.82 g of a 6.87% by weight aqueous solution of ammonium persulfate were added dropwise into the reaction vessel over 4 hours and, then, an additional 4.46 g of the 6.87% by weight aqueous solution of ammonium persulfate was added dropwise into the reaction vessel over an hour.

Thereafter, the temperature was still maintained at 80° C. for an hour to drive the polymerization reaction to completion and, after neutralization to pH 7.0 with an aqueous solution of sodium hydroxide, a copolymer (14) of the present invention was obtained in the form of an aqueous solution thereof with a weight average molecular weight of 24,800.

PRODUCTION EXAMPLE 15

A glass reaction vessel equipped with a thermometer, stirrer, dropping funnel, nitrogen inlet tube and reflux condenser was charged with 34.2 g of methoxypolyethylene glycol monomethacrylate (average number of moles of ethylene oxide added: 25), 1.39 g of heptadecanoxypolypropylene glycol-polyethylene glycol monomethacrylate (average number of moles of propylene oxide added: 24; average number of moles of ethylene oxide added: 3), 1.39 g of styrene, 7.36 g of methacrylic acid, 11.08 g of water and 0.49 g of 3-mercaptopropionic acid, the reaction vessel was purged with nitrogen under stirring, and the contents were heated to 80° C. under nitrogen.

Then, a monomer mixture composed of 68.4 g of methoxypolyethylene glycol monomethacrylate (average number of moles of ethylene oxide added: 25), 2.77 g of heptadecanoxypropylene glycol-polyethylene glycol monomethacrylate (average number of moles of propylene oxide added: 24; average number of moles of ethylene oxide added: 3), 2.77 g of styrene, 14.73 g of methacrylic acid, 22.15 g of water and 0.98 g of 3-mercaptopropionic acid, and 17.82 g of a 6.87% by weight aqueous solution of ammonium persulfate were added dropwise into the reaction vessel over 4 hours and, then, an additional 4.46 g of the 6.87% by weight aqueous solution of ammonium persulfate was added dropwise into the reaction vessel over an hour. Thereafter, the temperature was still maintained at 80° C. for an hour to drive the polymerization reaction to completion and, after neutralization to pH 7.0 with an aqueous solution of sodium hydroxide, a copolymer (15) of the present invention was obtained in the form of an aqueous solution thereof with a weight average molecular weight of 20,500.

PRODUCTION EXAMPLE 16

A glass reaction vessel equipped with a thermometer, stirrer, dropping funnel, nitrogen inlet tube and reflux condenser was charged with 33.74 g of methoxypolyethylene glycol monomethacrylate (average number of moles of ethylene oxide added: 25), 1.85 g of heptadecanoxypolypropylene glycol-polyethylene glycol monomethacrylate (average number of moles of propylene oxide added: 24; average number of moles of ethylene oxide added: 3), 1.39 g of styrene, 7.36 g of methacrylic acid, 11.08 g of water and 0.49 g of 3-mercaptopropionic acid, the reaction vessel was purged with nitrogen under stirring, and the contents were heated to 80° C. under nitrogen.

Then, a monomer mixture composed of 67.47 g of methoxypolyethylene glycol monomethacrylate (average number of moles of ethylene oxide added: 25), 3.7 g of heptadecanoxypolypropylene glycol-polyethylene glycol monomethacrylate (average number of moles of propylene oxide added: 24; average number of moles of ethylene oxide added: 3), 2.77 g of styrene, 14.72 g of methacrylic acid, 22.15 g of water and 0.98 g of 3-mercaptopropionic acid, and 17.82 g of a 6.87% by weight aqueous solution of ammonium persulfate were added dropwise into the reaction vessel over 4 hours and, then, an additional 4.46 g of the 6.87% by weight aqueous solution of ammonium persulfate was added dropwise into the reaction vessel over an hour. Thereafter, the temperature was still maintained at 80° C. for an hour to drive the polymerization reaction to completion and, after neutralization to pH 7.0 with an aqueous solution of sodium hydroxide, a copolymer (16) of the present invention was obtained in the form of an aqueous solution thereof with a weight average molecular weight of 20,700.

COMPARATIVE PRODUCTION EXAMPLE 1

A glass reaction vessel equipped with a thermometer, stirrer, dropping funnel, nitrogen inlet tube and reflux condenser was charged with 100.87 g of methanol, the reaction vessel was purged with nitrogen under stirring, and the contents were heated to 60° C. under nitrogen. Then, a monomer solution (169.5 g) composed of 111.18 g of methoxypolyethylene glycol monomethacrylate (average number of moles of ethylene oxide added: 23), 1.41 g of methoypolypropylene-polyethylene glycol monomethacrylate (average number of moles of propylene oxide added: 20; average number of moles of ethylene oxide added: 3), 22.41 g of methacrylic acid, 33.41 g of methanol and 0.77 g of 3-mercaptopropionic acid (chain transfer agent), and a methanolic solution (30 g) containing 1.55 g of azobisisobutyronitrile were added dropwise over 4 hours and 5 hours, respectively. Thereafter, the temperature was still maintained at 60° C. for an hour to drive the polymerization reaction to completion, the methanol was distilled off, water was then added and, after neutralization with an aqueous solution of sodium hydroxide, a copolymer (1) for comparison was obtained in the form of an aqueous solution thereof with a weight average molecular weight of 24,300.

COMPARATIVE PRODUCTION EXAMPLE 2

A glass reaction vessel equipped with a thermometer, stirrer, dropping funnel, nitrogen inlet tube and reflux condenser was charged with 106.07 g of methoxypolyethylene glycol monomethacrylate (average number of moles of ethylene oxide added: 25), 4.16 g of methyl methacrylate, 22.08 g of methacrylic acid, 34.21 g of water and 1.37 g of 3-mercaptopropionic acid, the reaction vessel was purged with nitrogen under stirring, and the contents were heated to 80° C. under nitrogen. Then, 22.38 g of a 6.87% by weight aqueous solution of ammonium persulfate was added dropwise into the reaction vessel over 5 hours. Thereafter, the temperature was still maintained at 80° C. for an hour to drive the polymerization reaction to completion and, after neutralization to pH 7.0 with an aqueous solution of sodium hydroxide, a copolymer (2) for comparison was obtained in the form of an aqueous solution thereof with a weight average molecular weight of 22,400.

COMPARATIVE PRODUCTION EXAMPLE 3

A glass reaction vessel equipped with a thermometer, stirrer, dropping funnel, nitrogen inlet tube and reflux condenser was charged with 100.3 g of water, the reaction vessel was purged with nitrogen under stirring, and the contents were heated to 80° C. under nitrogen. Then, an aqueous monomer solution composed of 112.6 g of methoxypolyethylene glycol monomethacrylate (average number of moles of ethylene oxide added: 25), 22.4 g of methacrylic acid, 0.94 g of 3-mercaptopropionic acid and 33.4 g of water and 30 g of a 5.16% by weight aqueous solution of ammonium persulfate were added dropwise into the reaction vessel over 4 hours and 5 hours, respectively. Thereafter, the temperature was still maintained at 80° C. for 1 hour to drive the polymerization reaction to completion and, after neutralization to pH 7.0 with an aqueous solution of sodium hydroxide, a copolymer (3) for comparison was obtained in the form of an aqueous solution thereof with a weight average molecular weight of 22,000.

COMPARATIVE PRODUCTION EXAMPLE 4

A glass reaction vessel equipped with a thermometer, stirrer, dropping funnel, nitrogen inlet tube and reflux condenser was charged with 102.89 g of methoxypolyethylene glycol monomethacrylate (average number of moles of ethylene oxide added: 25), 3.87 g of methoxypolypropylene glycol-polyethylene glycol (average number of moles of propylene oxide added: 24; average number of ethylene oxide added: 3), 22.08 g of methacrylic acid, 34.21 g of water and 1.45 g of 3-mercaptopropionic acid. The reaction vessel was purged with nitrogen under stirring, and the contents were heated to 80° C. under nitrogen. Then, 22.38 g of a 6.87% by weight aqueous solution of ammonium persulfate was added dropwise into the reaction vessel over 5 hours. Thereafter, the temperature was still maintained at 80° C. for 1 hour to drive the polymerization reaction to completion and, after neutralization to pH 7.0 with an aqueous solution of sodium hydroxide, a copolymer (4) for comparison was obtained in the form of an aqueous solution thereof with a weight average molecular weight of 26,800.

EXAMPLES 1 AND 2 AND COMPARATIVE EXAMPLE 1

Mortar Test 1

Mortars were prepared by adding the copolymers (1) and (2) of the invention and the copolymer (1) for comparison, respectively, and tested for changes in flow value with time and for amount of air entrained.

The mortar formulation used in the test was as follows: 600 g of Taiheiyo ordinary portland cement, 600 g of Toyoura standard sand, and 210 g of water containing the copolymer (1) or (2) of the invention or the copolymer (1) for comparison.

The mortars were prepared by dry mixing the cement and sand mechanically in a mortar mixer at a low speed for 30 seconds and, then, adding the water containing the additive, followed by 3 minutes of kneading. Each mortar prepared was packed in a hollow cylinder having a diameter of 55 mm and a height of 50 mm at 5 minutes, 30 minutes, 60 minutes and 90 minutes after pouring of water. Each cylinder was then lifted vertically and the mortar spread over the table was measured for diameter in two directions. The mean diameter value was recorded as the flow value. As for the amount of air entrained, the weight of 500 ml of mortar was measured and said amount was calculated from the mortar volume and weight. The results thus obtained are shown below in Table 2.

TABLE 2

| Copolymer tested | | Addition amount (wt %/ cement)[1] | Flow value (mm) (upper culumn) The amount of entrained air (%) (lower column) | | | |
| --- | --- | --- | --- | --- | --- | --- |
| | | | 5 min. | 30 min. | 60 min. | 90 min. |
| Example 1 | Copolymer (1) according to the invention | 0.15 | 115 2.6 | 102 2.3 | 99 2.8 | 89 3.4 |
| Example 2 | Copolymer (2) according to the invention | 0.15 | 111 2.6 | 99 1.9 | 89 2.2 | 77 2.2 |
| Compar. Ex. 1 | Copolymer (1) for comparison | 0.15 | 113 4.2 | 108 3.8 | 105 4.6 | 98 4.7 |

[1]Polymer solids weight % relative to cement weight

From the results shown in Table 2, it was found that while the amount of entrained air after 5 minutes was 4.2% with the mortar of Comparative Example 1 in which the copolymer (1) for comparison was used, the amounts of entrained air after 5 minutes were each 2.6% with the mortars of Examples 1 and 2 in which the copolymers (1) and (2) of the present invention were respectively used and that, therefore, the amount of entrained air could sufficiently be reduced in Examples 1 and 2 as compared with Comparative Example 1.

The reason why the copolymers (1) and (2) of the present invention could sufficiently reduce the amount of entrained air is presumably that the copolymer (1) of the invention has the butoxypolypropylene glycol monomethacrylate (average number of moles of propylene oxide added: 20) introduced therein as a monomer (I) having an air entrained property reducing effect and the copolymer (2) of the invention has the nonyloxypolypropylene-polyethylene glycol monomethacrylate (average number of moles of propylene oxide added: 20; average number of moles of ethylene oxide added: 3) introduced therein as a monomer (I) having the same effect and, therefore, owing to the terminal alkyl group of monomer (I), which is butyl or nonyl and thus has a sufficient hydrophobic effect, the amount of air entrained could sufficiently be reduced. On the other hand, the copolymer (1) for comparison has the methoxypropylene-polyethylene glycol monomethacrylate (average number of moles of propylene oxide added: 20; average number of moles of ethylene oxide added: 3) introduced therein as a monomer (I) and the amount of entrained air could not sufficiently be reduced presumably because of the terminal alkyl group, which is a methyl group, having strong hydrophilicity.

EXAMPLES 3 TO 20 AND COMPARATIVE EXAMPLE 2

Mortar Test 2

Mortars were prepared by adding the copolymers (3) to (16) of the invention and the copolymer (1) for comparison, respectively, and tested for measuring flow value and the amount of air entrained.

The mortar formulation used in the test was as follows: 800 g of Taiheiyo ordinary portland cement, 400 g of Toyoura standard sand, and 200 g of water containing one of the copolymers (3) to (11) of the invention or the copolymer (1) for comparison.

The mortars were prepared by dry mixing the cement and sand mechanically in a mortar mixer at a low speed for 30 minutes and, then, adding the water containing the additive, followed by 5 minutes of kneading. Each mortar prepared was packed in a hollow cylinder having a diameter of 55 mm and a height of 50 mm and, then, each cylinder was lifted and the mortar spread over the table was measured for diameter in two directions. The mean diameter value was recorded as the flow value. As for the amount of air entrained, the weight of 500 ml of mortar was measured and said amount was calculated from the mortar volume and weight. The results thus obtained are shown below in Table 3.

TABLE 3

| | Copolymer tested | The addition amount (wt %/cement)[1] | The addition amount of AE agent[2] (wt %/cement)[1] | Flow value (mm) | Air content (vol %) |
|---|---|---|---|---|---|
| Ex. 3 | Copolymer (3) according to the invention | 0.26 | — | 153 | 2.3 |
| Ex. 4 | Copolymer (4) according to the invention | 0.23 | — | 152 | 3.3 |
| Ex. 5 | Copolymer (5) according to the invention | 0.29 | — | 149 | 2.0 |
| Ex. 6 | Copolymer (6) according to the invention | 0.44 | — | 160 | 2.5 |
| Ex. 7 | Copolymer (7) according to the invention | 0.45 | — | 168 | 2.3 |
| Ex. 8 | Copolymer (8) according to the invention | 0.41 | — | 161 | 2.9 |
| Ex. 9 | Copolymer (9) according to the invention | 0.43 | — | 138 | 5.4 |
| Ex. 10 | Copolymer (10) according to the invention | 0.26 | — | 147 | 3.3 |
| Ex. 11 | Copolymer (11) according to the invention | 0.26 | — | 150 | 2.4 |
| Ex. 12 | Copolymer (5) according to the invention | 0.29 | 0.01 | 168 | 15.3 |
| Ex. 13 | Copolymer (5) according to the invention | 0.29 | 0.003 | 161 | 7.2 |
| Ex. 14 | Copolymer (10) according to the invention | 0.26 | 0.01 | 167 | 16.8 |
| Ex. 15 | Copolymer (10) according to the invention | 0.26 | 0.003 | 158 | 8.1 |
| Ex. 16 | Copolymer (12) according to the invention | 0.26 | — | 169 | 2.3 |
| Ex. 17 | Copolymer (13) according to the invention | 0.26 | — | 140 | 2.5 |
| Ex. 18 | Copolymer (14) according to the invention | 0.23 | — | 150 | 1.9 |
| Ex. 19 | Copolymer (15) according to the invention | 0.23 | — | 152 | 2.0 |
| Ex. 20 | Copolymer (16) according to the invention | 0.26 | — | 148 | 2.2 |
| Compar. Ex. 2 | Copolymer (1) for comparison | 0.26 | — | 153 | 7.2 |

[1]Polymer solids weight % relative to cement weight
[2]Vinsol (Yamamune chemicals) was used as the AE agent.

From the results shown in Table 3, it was found that while the amount of entrained air was 7.2% with the mortar of Comparative Example 2 in which the copolymer (1) for comparison was used, the amounts of entrained air were found reduced to 1.3 to 5.4% with the mortars of Examples 3 to 11 and 16 to 20 in which the copolymers (3) to (16) of the present invention were respectively used. In Examples 12 to 15, the copolymer (5) or (10) of the present invention was used in combination with an air-entraining.(AE) agent. It was found that the amount of entrained air can be adjusted arbitrarily by combinedly using an air-entraining agent.

EXAMPLES 21 TO 24 AND COMPARATIVE EXAMPLE 3

Storage Stability Test

A 10% by weight aqueous solution of each of the copolymers (3) to (5) and (11) of the present invention with monomer (I) introduced therein was subjected to a storage stability test at 50° C. A 10% by weight aqueous solution of the copolymer (2) for comparison, which had no monomer (I) introduced therein, with heptadecanoxypolypropylene glycol-polyethylene glycol (average number of propylene oxide added: 24; average number of ethylene oxide added: 3), an antifoaming agent, separately added in an amount of 0.5% by weight relative to the copolymer (2) for comparison was also subjected to the same storage stability test at 50° C. The storage stability data obtained after one month of storage are shown below in Table 4.

TABLE 4

| | Copolymer tested | The condition of 10% aqueous solution after 1 month | Storage stability |
|---|---|---|---|
| Ex. 21 | Copolymer (3) according to the invention | A preciptates was formed in a slight amount on the gas-liquid surface. | ○ |
| Ex. 22 | Copolymer (4) according to the invention | A preciptates was scarcely formed. | ⊙ |
| Ex. 23 | Copolymer (5) according to the invention | A preciptates was scarcely formed. | ⊙ |
| Ex. 24 | Copolymer (11) according to the invention | A preciptates was formed in a little amount on the gas-liquid surface. | Δ |
| Compar. Ex. 3 | Copolymer (1) for comparison | The antiforming agent was completely separated on the gas-liquid surface. | x |

With the aqueous solution of the copolymer (2) for comparison which containing said antifoming agent separately added, the antifoaming agent completely separated on the gas-liquid interface. With the aqueous solution of the copolymer (11) of the present invention in Example 24, a precipitate was formed in a slight amount but the amount thereof was smaller than that in Comparative Example 2. With the aqueous solutions of the copolymers (3) to (5) of the invention, in which a hydrophobic monomer (IV) was used, namely in Examples 21 to 23, the amount of the substance deposited was much more reduced and, in Examples 22 and 23, the solution of the copolymer (4) or (5) showed very good storage stability without giving any precipitate.

EXAMPLES 25 TO 28 AND COMPARATIVE EXAMPLES 4 AND 5

Concrete Test

According to two formulations, namely the admixture-free plain concrete formulation (formulation I) shown in Table 5 and the formulation (formulation II), which is a modification of formulation I made by reducing the unit quantity of water by 18%, as shown in Table 5, the respective materials were weighed so that the mixture volume amounted to 30 liters. A 50-liter pan type, forced mixing type mixer was charged with cement and fine aggregate and dry mixing was conducted for 10 seconds, water containing the polymer was then added and kneading was conducted for 30 seconds. Coarse aggregate was then added and kneading was carried out for 90 seconds, to give concrete.

TABLE 5

| Kind of material | W/C[1] (%) | s/a[2] (%) | Unit amount (kg/m³) | | | |
|---|---|---|---|---|---|---|
| | | | Cement | Water | Fine aggregate | Coarse aggregate |
| I | 65.9 | 50.0 | 320 | 211 | 881.3 | 867.8 |
| II | 54.1 | 49.0 | 320 | 173 | 873.5 | 895.7 |

[1] Unit quantity of water relative to unit quantity of cement
[2] Sand-aggregate ratio: the absolute volume ratio expressed in parcentage, of the fine aggregate to the total aggregate in the concrete.

The materials used were as follows:
Fine aggregate: Oigawa land sand (specific gravity 2.62; FM value 2.67)
Coarse aggregate: Oume hard crushed stone (specific gravity 2.58; MS value 20 mm)
Cement: Taiheiyo ordinary portland cement The concrete test was conducted in the manner mentioned below and the results are shown in Table 6.
(1) Slump
The slump immediately after kneading was measured according to JIS A 1101.
(2) Air Content
The air content was determined according to JIS A 1128.

TABLE 6

| | | Addition amount (wt %/C)[1] | Slump (cm) | Air content (%) |
|---|---|---|---|---|
| Ex. 25 | Copolymer (5) according to the invention | 0.21 | 18.0 | 3.2 |
| Ex. 26 | Copolymer (10) according to the invention | 0.16 | 18.0 | 1.5 |
| Ex. 27 | Copolymer (14) according to the invention | 0.18 | 18.0 | 1.4 |
| Ex. 28 | Copolymer (16) according to the invention | 0.18 | 17.5 | 1.3 |
| Compar. Ex. 4 | Copolymer (3) for comparison | 0.15 | 17.5 | 5.2 |
| Compar. Ex. 5 | Copolymer (1) for comparison | 0.21 | 17.5 | 4.9 |

[1] Polymer solids weight % relative to cement weight

As is evident from the results shown in Table 6, the samples used in Examples 25 to 28 each could reduce the air content to 3.2% to 1.3% as compared with the samples used in Comparative Examples 4 and 5 which gave air contents of 4.9% to 5.2% at slump of 17.5 cm.

EXAMPLES 29 TO 31 AND COMPARATIVE EXAMPLES 6 AND 7

With each of the copolymers (5), (14) and (16) according to the present invention and the copolymers (3) and (4) for comparison, the surface tension and ultraviolet transmittance (at 600 nm) of a 0.1% by weight aqueous solution of polymer treated with ether, and the weight proportion of solids on filter after filtration of a 10% by weight aqueous solution of polymer treated with ether through a filter with a pore size of 0.45 μm relative to the non-volatile matter weight in the aqueous solution before filtration were measured by the methods mentioned above.

The results are shown in Table 7, together with the results obtained with the copolymers (5), (14) and (16) according to the present invention and the results of the concrete tests in Examples 25, 27 and 28 and Comparative Example 4, obtained with the copolymer (3) for comparison.

TABLE 7

| | | Surface tention (dyn/cm) | UV transmittance (%) | The weight proportion of solids on filter after filtration (wt %) | Addition amount (wt %/C)[1] | Slump (cm) | Air content (%) |
|---|---|---|---|---|---|---|---|
| Ex. 29 | Copolymer (5) according to the invention | 48.0 | 53.5 | 0.10 | 0.21 | 18.0 | 3.2 |
| Ex. 30 | Copolymer (14) according to the invention | 44.5 | 40.6 | 0.76 | 0.18 | 18.0 | 1.4 |
| Ex. 31 | Copolymer (18) according to the invention | 38.7 | 32.8 | 1.76 | 0.18 | 17.5 | 1.3 |
| Compar. Ex. 6 | Copolymer (3) for comparison | 72.8 | 84.4 | 0.00 | 0.15 | 17.5 | 5.2 |
| Compar. Ex. 7 | Copolymer (4) for comparison | 55.5 | 24.6 | 1.43 | — | — | — |

[1] Polymer solids weight % relative to cement weight

EFFECTS OF THE INVENTION

The cement additive of the present invention, which has the constitution mentioned above, can sufficiently reduce air entrained property and therefore can readily give the mortar or concrete strength as desired. Furthermore, it has good cement dispersing and dispersion maintaining capacities, making it possible to improve the workability of mortar or concrete.

What is claimed is:
1. A composition for use as a cement additive which comprises a copolymer (A) obtained by polymerizing a monomer mixture (K), wherein;

said monomer mixture (K) comprises a polyalkylene glycol ester monomer (I) represented by the formula (1):

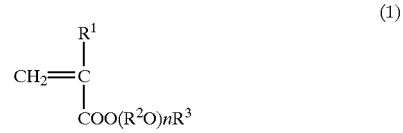

wherein $R^1$ represents a hydrogen atom or a methyl group, the $R^2O$ groups are the same or different and each represents an oxyalkylene group containing 2 to 18 carbon atoms and the majority thereof are oxyalkylene groups containing not less than 3 carbon atoms, $R^3$ represents an aliphatic hydrocarbon group containing 4 to 30 carbon atoms or an alicyclic hydrocarbon group containing 4 to 30 carbon atoms, and n represents the average number of moles of oxyalkylene groups and is a number of 5 to 300, with the condition that the average number of moles of oxyalkylene groups containing not less than 3 carbon atoms is not less than 5;

a polyalkylene glycol ester monomer (II) represented by the formula (2):

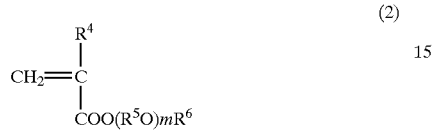

(2)

wherein $R^4$ represents a hydrogen atom or a methyl group, the $R^5O$ groups are the same or different and each represents an oxyalkylene group containing 2 to 18 carbon atoms and the majority thereof are oxyethylene groups, $R^6$ represents a hydrocarbon group containing 1 to 30 carbon atoms, and m represents the average number of moles of oxyalkylene groups and is a number of 2 to 300; and a carboxylic acid monomer (III) represented by the formula (3):

(3)

wherein $R^7$ represents a hydrogen atom or a methyl group, and M represents a hydrogen atom, a metal atom, an ammonium group or an organic amine group.

2. The composition for use as a cement additive according to claim 1,
wherein said monomer mixture (K) comprises said polyalkylene glycol ester monomer (I), at least two species of said polyalkylene glycol ester monomer (II) each of which has a m value that differs from the other, and said carboxylic acid monomer (III).

3. The composition for use as a cement additive according to claim 1,
wherein said monomer mixture (K) further comprises a hydrophobic monomer (IV) having a solubility parameter δ of not more than 20 $MPa^{1/2}$.

4. The composition for use as a cement additive according to claim 3, wherein said hydrophobic monomer (IV) has no ester bonding therein.

5. The composition for use as a cement additive according to claim 1, wherein the $R^2O$ groups are oxyalkylene groups containing not less than 3 carbon atoms and the $R^5O$ groups are oxyethylene groups.

* * * * *